US012724403B2

(12) United States Patent
Mills et al.

(10) Patent No.: US 12,724,403 B2
(45) Date of Patent: Sep. 1, 2026

(54) VIRTUALIZATION OF AN INDUSTRIAL CONTROL SYSTEM IN AN INDUSTRIAL AUTOMATION SYSTEM

(71) Applicant: Rockwell Automation Technologies, Inc., Mayfield Heights, OH (US)

(72) Inventors: Jonathan A. Mills, Mayfield Heights, OH (US); Nathaniel S. Sandler, Chagrin Falls, OH (US); Eugene Mourzine, Twinsburg, OH (US); David C. Mazur, Mequon, WI (US); Rob A. Entzminger, Shawnee, KS (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 494 days.

(21) Appl. No.: 18/227,100

(22) Filed: Jul. 27, 2023

(65) Prior Publication Data

US 2025/0036109 A1 Jan. 30, 2025

(51) Int. Cl.
*G05B 19/418* (2006.01)

(52) U.S. Cl.
CPC .................... *G05B 19/4185* (2013.01); *G05B 2219/36529* (2013.01)

(58) Field of Classification Search
CPC .................. G05B 19/4185; G05B 2219/36529
See application file for complete search history.

(56) References Cited

U.S. PATENT DOCUMENTS 10,715,388 B2 7/2020 Fildebrandt et al.
10,795,347 B2 10/2020 Sayyarrodsari et al.
11,182,206 B2 11/2021 Jung et al.
11,474,873 B2 10/2022 Biernat et al.
11,513,877 B2 11/2022 Biernat et al.
2013/0212129 A1* 8/2013 Lawson .................... G06F 1/12
707/779

(Continued)

FOREIGN PATENT DOCUMENTS

KR 20200027783 A 3/2020
WO 2020184362 A1 9/2020

OTHER PUBLICATIONS

U.S. Appl. No. 18/227,091, filed Jul. 27, 2023, Jonathan A. Mills.

(Continued)

*Primary Examiner* — Christopher E. Everett
(74) *Attorney, Agent, or Firm* — Fletcher Yoder, P.C.

(57) ABSTRACT

Systems and methods described herein may involve an industrial network device that performs an operation based on symbolic data received via an input terminal. The systems and methods may involve processing circuitry coupled via an output terminal to the input terminal. The processing circuitry may provide a virtualized control system communicatively coupled to the industrial network device via the output terminal, receive an event notification from a first container provided by one or more computing devices external to the industrial automation system, operate the virtualized control system to expose the event notification via a symbolic common industrial protocol (CIP) namespace to provide the symbolic data to the input terminal based on the event notification, and transmit the symbolic data corresponding to the virtualized control system via the one or more input terminals to the industrial network device.

20 Claims, 13 Drawing Sheets

(56) References Cited

U.S. PATENT DOCUMENTS

| | | | | |
|---|---|---|---|---|
| 2014/0336785 | A1* | 11/2014 | Asenjo | G06Q 10/06 700/17 |
| 2015/0019191 | A1* | 1/2015 | Maturana | G05B 19/0423 703/13 |
| 2016/0274552 | A1* | 9/2016 | Strohmenger | G06Q 10/06 |
| 2016/0274558 | A1* | 9/2016 | Strohmenger | G05B 15/02 |
| 2018/0024537 | A1 | 1/2018 | Chauvet et al. | |
| 2018/0054469 | A1 | 2/2018 | Simoncelli | |
| 2019/0377604 | A1 | 12/2019 | Cybulski | |
| 2020/0136906 | A1 | 4/2020 | Bernat et al. | |
| 2020/0249928 | A1 | 8/2020 | Zeng et al. | |
| 2020/0278892 | A1 | 9/2020 | Nainar et al. | |
| 2020/0311617 | A1 | 10/2020 | Swan et al. | |
| 2021/0089354 | A1 | 3/2021 | Nixon et al. | |
| 2021/0200814 | A1 | 7/2021 | Tal et al. | |
| 2021/0218617 | A1 | 7/2021 | Palavalli et al. | |
| 2021/0382727 | A1 | 12/2021 | Vigil et al. | |
| 2022/0027721 | A1 | 1/2022 | Thoemmes et al. | |
| 2022/0091572 | A1 | 3/2022 | Biernat et al. | |
| 2022/0091583 | A1* | 3/2022 | Biernat | G06F 9/44505 |
| 2022/0391259 | A1 | 12/2022 | Biernat et al. | |

OTHER PUBLICATIONS

U.S. Appl. No. 18/228,398, filed Jul. 31, 2023, David C. Mazur.

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Liu, Y et al., "A Data-Centric Internet of Things Framework Based on Azure Cloud," IEEE Access, vol. 7, Mar. 27, 2019, 20 pages.

* cited by examiner

| PHYSICAL IO | CLASS ID | STATE | STORAGE OF DATA |
|---|---|---|---|
| 1 | Con1 | Alarm | Loc1 |
| N | ConN | Normal | LocN |
| N+1 | Null | Null | Null |

VIRTUALIZATION OF AN INDUSTRIAL CONTROL SYSTEM IN AN INDUSTRIAL AUTOMATION SYSTEM

BACKGROUND

The present disclosure generally more particularly, to control systems that identify operational anomalies based on device relates to control systems and methods, and data associated with an operational technology (OT) network that includes one or more industrial automation systems.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (IO) modules, communication networks, human-machine interface (HMI) terminals, and the like.

Generally, industrial control systems that operate in the OT environment are used to control industrial devices accessible via an OT network. Data generated external to the OT network may generally be prevented from affecting industrial control system operations, such as from a network security perspective. However, some monitoring or processing operations may be increasingly performed in a cloud-computing environment or otherwise remotely from the OT environment. For data generated in these remote monitoring operations, improved systems and methods for introducing the data back into the OT network may be desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system may include an industrial network device that includes one or more input terminals. The industrial network device may perform one or more operations in association with an industrial automation system based on symbolic data received via the one or more input terminals. The system may include processing circuitry that includes one or more output terminals communicatively coupled to the one or more input terminals. The processing circuitry may provide a virtualized control system communicatively coupled to the industrial network device via the one or more output terminals. The processing circuitry may receive an event notification from a first container provided by one or more computing devices external to the industrial automation system. The processing circuitry may operate the virtualized control system to expose the event notification via a symbolic common industrial protocol (CIP) namespace. The symbolic CIP namespace may provide the symbolic data to the one or more input terminals based on the event notification. The processing circuitry may transmit the symbolic data corresponding to the virtualized control system via the one or more input terminals to the industrial network device.

In another embodiment, a non-transitory, tangible, computer-readable medium may store instructions that, when executed by processing circuitry, cause the processing circuitry to perform operations. The operations may include receiving a first container image corresponding to a first deployed container from a container orchestration system. The operations may include executing the first container image to spin up the first deployed container. The operations may include providing a virtualized control system based on the first deployed container, where the virtualized control system may be communicatively coupled to one or more input terminals able to be coupled to an industrial network device at one or more output terminals. The operations may include receiving data from a second deployed container and operating the virtualized control system to expose the data via a symbolic common industrial protocol (CIP) namespace. The symbolic CIP namespace may provide symbolic data to the one or more input terminals based on the data. The operations may include transmitting the symbolic data via the one or more input terminals to the industrial network device.

In a further embodiment, a non-transitory, tangible, computer-readable medium may store instructions that, when executed by processing circuitry of an industrial control system, cause the industrial control system to perform operations. The operations may include receiving an input/output assignment configured to associate one or more output terminals with one or more input terminals of second processing circuitry and with a virtualized control system. The second processing circuitry may provide the virtualized control system as associated with a control network level disposed below a supervisory network level. The operations may include receiving, via a communicative coupling between the one or more output terminals and the one or more input terminals, data from the virtualized control system based on the input/output assignment, where the data was generated in association with an operation of an asset by a container deployed external to the second processing circuitry. The operations may include identifying an adjustment to a visualization presented via a human-machine interface (HMI) based on the data and generating one or more control signals to implement the adjustment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
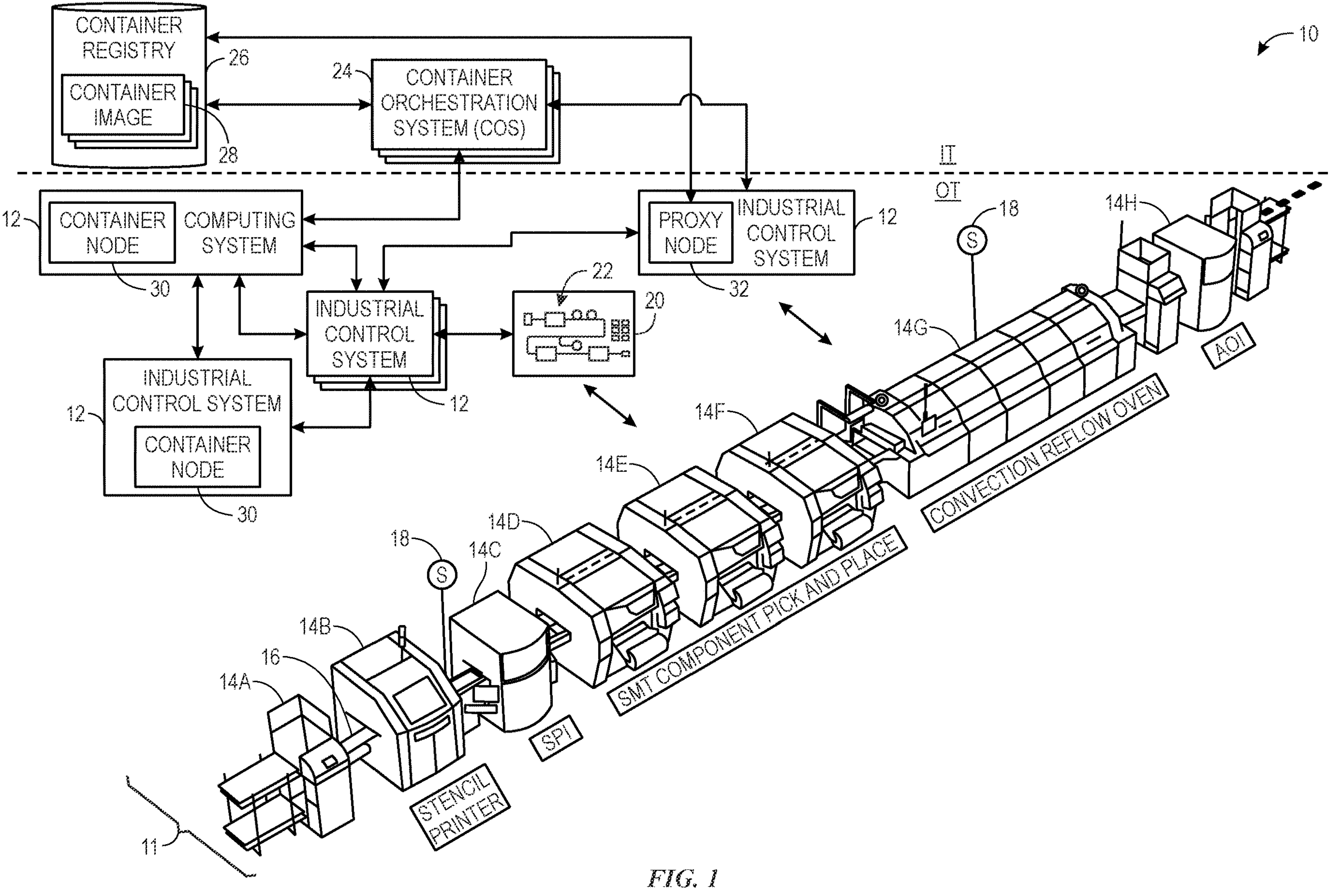
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are generally directed toward industrial automation systems that implement container technologies. Indeed, an industrial automation system may include a container orchestration system in an operational technology (OT) network. The container orchestration system may work in tandem with an informational technology (IT) network and/or industrial control systems to control, monitor, and otherwise manage devices of the industrial automation system. In this way, the container orchestration system may aid collecting and analyzing data from OT devices. Containers include packages of software that may include various elements needed to run in one or more software environments. As a result, containers may be deployed as individual software modules that perform specific operations or functions on the data provided to the respective container. Deploying a container closer to a data source may enable more direct, unprocessed access to data from the data source, which may improve a quality of results being produced by the operations of the containers-such as an accuracy of a prediction made by the container.

Routing data generated by the container may pose challenges. One option would be to reprogram and edit existing data exchange pathways to run in parallel to the container data generation. For example, updating configuration of a distributed control system (DCS) and/or a human-machine interface (HMI) to operate based on data from the container may increase costs from a time-cost or financial-cost perspective. Indeed, reprogramming a data exchange pathway from a level 0 device to a higher level device, like a level 5 network device may be expensive, burdensome, and subject to error, that is, if there is even space from an input/output pin to be adding additional inputs upstream.

Indeed, it may be desirable to reuse at least a portion of an existing data pathways to enable a container to inject generated data back into the industrial automation system. By doing so, results may be consumed more efficiently by data pathways that have already been programmed, such as programmed to transmit sensed data from a level 0 industrial automation device to a higher level network device. To do so, an industrial automation device may be virtualized at a lower level and provide an access point that the container may use transmit data to another networked device of the industrial automation system. Virtualized industrial automation devices may include sensors, control systems, or the like. Containers may refer to OT network-based containerized applications, IT network-based containerized applications, cloud-orchestrated containerized applications, or the like.

Indeed, by using virtualized devices, various containerized applications may be presented to the industrial control system as physical IO or automation controllers. Indeed, the container may present itself as a physical IO device and allow a controller to perform cyclic data exchange (class 1 messaging), or, in another embodiment, the container may present itself as another controller and allow the physical controller to perform cyclic data exchange through produce/consume tags operations. By doing so, systems upstream from the virtualized industrial automation device may more readily consume the data generated without the data pathway beyond the virtualized industrial automation device and/or control system having to be reprogrammed. Additional details are discussed below with reference to FIGS. 1-13.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process (e.g., system 11), such as printed circuit board (PCB) manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 22 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 22. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 22 depicts representations of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 22. The person operating and/or monitoring the industrial automation system 10 may reference the display/operator interface 22 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system, on the other hand, may operate in an information technology (IT) environment. That is, the container orchestration system may include a cluster of multiple computing devices that coordinates an automatic process of managing or scheduling work of individual containers for applications within the computing devices of the cluster. In other words, the container orchestration system may be used to automate various tasks at scale across multiple computing devices. By way of example, the container orchestration system may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system may use configuration files to determine a network protocol to facilitate communication between containers, a storage location to save logs, and the like. The container orchestration system may also schedule deployment of containers into clusters and identify a host (e.g., node) that may be best suited for executing the container. After the host is identified, the container orchestration system may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
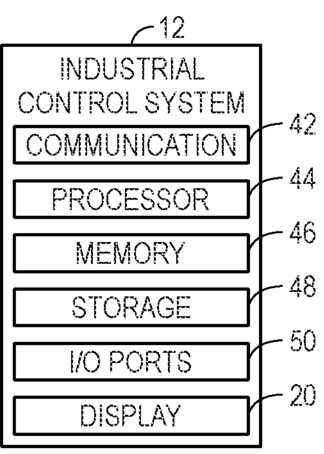
FIG. 2 is a block diagram of an example industrial control system, in accordance with an embodiment.

With the foregoing in mind, FIG. 2 is a block diagram of an example computing device, such as the industrial control system 12, that may be used with the embodiments described herein. The industrial control system 12 may include a communication component 42, a processor 44, a memory 46, a storage 48, input/output (IO) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The IO ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the computing device being the industrial control system 12, it should be noted that the container orchestration system 24, the container nodes 30, the proxy node 32, or any other computing or processing device described herein may also include the same or similar components to perform, or facilitate performing, the various operations described herein. Moreover, it should be understood that the components described with respect to FIG. 2 are exemplary figures and the industrial control system 12 and other suitable computing systems may include additional or fewer components as detailed above.

Figure 3:
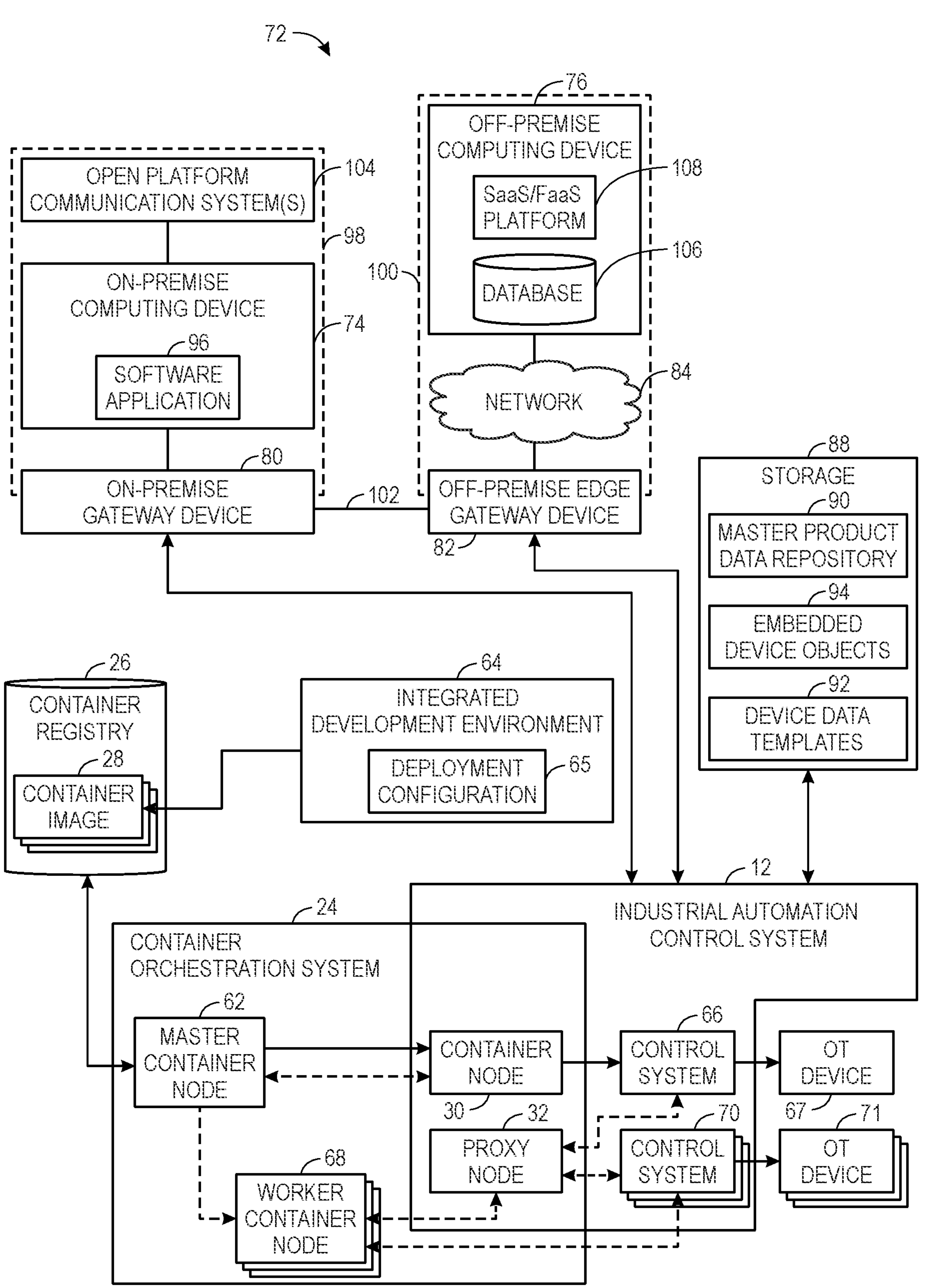
FIG. 3 is a block diagram of an example operational technology (OT) network, a first computing system (e.g., on-premise computing system), and a second computing system (e.g., off-premise computing system), one or more of which may coordinate with a container orchestration system, in accordance with an embodiment.

With the foregoing in mind, FIG. 3 illustrates a block diagram of an example operational technology (OT) network, a first computing system (e.g., on-premise computing system), and a second computing system (e.g., off-premise computing system), one or more of which may coordinate with the container orchestration system 24. The first computing system may correspond computing devices disposed as part of a domain 98, which could be located on-premise of the industrial automation system 10, such as computing device 74, on-premise gateway device 80, an open platform communication system(s) 104, or the like.

The second computing system may correspond to computing devices disposed as part of a domain 100, which could be located off-premise of the industrial automation system 10, such as computing device 76, devices providing a network 84, an off-premise edge gateway device 82, or the like. In some example systems, one or more other devices of the domain 98 may be physically located outside of the industrial automation system 10, such as may be the case if a device is remotely accessing a software application 96 while located at a second physical location different from that of the industrial automation system 10. This may similarly apply to off-premise devices and thus one or more other devices of the domain 100 may be physically located outside of the industrial automation system 10. Thus, when user equipment remotely accesses the software application 96 while located at "home" or at the second physical location, it should be understood that the user equipment may not be automatically considered an off-premise computing device by nature of the user equipment being at the second physical location.

With this in mind, there may be benefits that arise from providing some access to data of the industrial automation system 10 to devices and/or platform services of the domain 100. Indeed, these off-premise systems may have access to higher-levels of information, such as sensed data or operational data spanning two or more industrial automation systems 10, and thus may provide enhanced monitoring or analysis capabilities relative to that of the industrial control system 12 and/or on-premise computing devices.

Indeed, computing devices 74 may include a variety of electronic devices associated with the industrial automation system 10, for example one or more user equipment (e.g., cellular devices) disposed off-premise but communicatively coupled to one or more computing devices disposed on-premise, such as when the user equipment is located at a home of an operator and is accessing data associated with the industrial automation system 10. The industrial control system 12 described above may include the computing devices 74, a gateway device 80, the industrial control system 12, and the edge gateway device 82, where the edge gateway device 82 may communicate with computing devices 76 via a network 84. When accessing web-based applications and/or graphical user interfaces, as described above, the computing device 74 may do so via the network 84 and/or via another network configurable to communicatively couple to the network 84 (illustrated via dashed line). Data generated by the gateway device 80, the computing device 74, the edge gateway device 82, and/or the computing device 76 may be exchanged among the system 72 to perform additional historical data logging, additional analysis, perform security operations (e.g., authenticating a user), or the like.

In some cases, the edge gateway device 82 may provide the acquired sensor data to software applications executed outside the industrial automation system 10 on the computing device 76 (e.g., SaaS/FaaS Platform 108, asset anomaly predictor 110). The software applications outside of the industrial automation system 10 may perform real time analysis of the sensor data within the industrial automation device 86 that had been acquired through the edge gateway device 82. As one example, the computing device 76 may provide a software-as-a-service and/or a Function-as-a-Service (SaaS/FaaS) platform 108 via the network 84. In this way, a processor of the computing device 76 may execute instructions stored in memory and/or storage to perform the asset anomaly predictor 110 systems and methods. In this way, the asset anomaly predictor 110 may correspond to instructions stored in non-transitory, computer readable medium of the computing device 76 that, when executed by processing circuitry, cause the computing device 76 to perform operations discussed herein as being performed by the asset anomaly predictor 110. The database 106 may include any suitable storage device, server, or the like, such as a web server (e.g., a unitary Apache installation), an application server (e.g., unitary JAVA Virtual Machine), and/or a database server (e.g., a unitary relational database management system (RDBMS) catalog). The SaaS/FaaS platform 108 provided by the edge gateway device 82 may include platforms such as THINGWORX® registered trademark of PTC. Inc., AZURE® registered trademark of Microsoft Corporation, FIIX® registered trademark of Fiix, Inc., INFLUXDB® registered trademark of InfluxData, Inc. or the like. The SaaS/FaaS platform 108 may manage data stored in the database 106 based on data received from the edge gateway device 82. In some cases, the computing device 76 may correspond to one or more data centers that may include one or more servers, one or more virtual servers, or the like, that each may be operated on one or more physical computing devices. The computing device 76 may provide one or more dashboards via a web-enabled communicative coupling to one or more other computing devices (e.g., computing device 74) to enable presentation of information generated via the SaaS/FaaS platform 108 through outputs of the one or more other computing devices. The network 84 may be any suitable wired or wireless network, such as a network enabled by the Internet or a cloud-based network. The network 84 may be an off-premise network used by the computing device 76 to transmit data to the edge gateway device 82. Using this information, the network 84 may route data and instructions between the computing device 76, database 106, and the edge gateway device 82. The edge gateway device 82 may have access to network information used to communicate with the industrial control system 12 and/or the gateway device 80, such as corresponding internet protocol (IP) address, uniform resource locators (URLs), or the like. In some cases, the edge gateway device 82 may be disposed on-premise of the industrial automation system 10 and be owned by a same entity who owns the gateway device 80 and have connectivity to the network 84.

After obtaining the data from the industrial automation device 86, the computing device 76 and/or the computing device 74 may log the data in real time to perform historical trending and analysis of the data over time. The computing device 76 and/or the computing device 74 may analyze the stored data over time. This process may involve historical trending of the data logged over time. The edge gateway device 82 may communicate via the network 84 to access a software application and/or to log the data in a database 106.

To support or supplement these monitoring and/or control operations, On-premise computing systems, off-premise computing systems, the industrial control system 12, or the like, may generate a request for a container. When doing so the request may be transmitted via a gateway device 80 and/or an edge gateway device 82.

The gateway device 80 and the edge gateway device 82 may be communicatively coupled to each other and to the industrial control system 12. The gateway device 80 may operate on a logical boundary between the industrial control system 12 and a domain 98 which refers to a computing domain in which associated devices within the domain 98 communicate via a first communication network and/or using communication methods corresponding to a first communication method or protocol. The edge gateway device 82 may operate on a logical boundary between the industrial automation system 10 and a different domain 100. The domain 100 may correspond to an off-premise computing domain in which associated devices within the domain 100 communicate via a second communication network and/or using communication methods corresponding to a second communication method or protocol. In both cases, the industrial control system 12 may use a third communication network to communicate with the gateway device 80, the edge gateway device 82, and the industrial automation devices 86. In some cases, the third communication network may be based on operations that expose data to the first communication and/or second communication network in a format and/or protocol that may be consistently consumed between the various networks, such as symbol and template based operations and communication methods. When the domain 100, the domain 98, and/or the industrial control system 12 use different protocols, formats, or networks, communications between the domains may be converted between the various protocols, formats, or networks, such as when transmitting a request for the container and/or receiving or sending data via the gateway devices 80, 82 or any of the networks.

To generate a container that may be referenced via indication in the request, any suitable method may be used. By way of operation, an integrated development environment (IDE) tool 64 may be used by an operator to develop a deployment configuration file 65. One or more IDE tools 64 may be disposed in the domain 98 and/or the domain 100, which may be accessed using computing device 74 and/or computing device 76. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65. In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

The container orchestration system 24 may include a master container node 62 to coordinate the execution and results from the various container nodes. The container orchestration system 24 may include a collection of nodes that are used to achieve a desired state of one or more containers across multiple nodes, where a container may be generated based on operations of the master container node 62 in response to an instruction from another computing device of FIG. 3, in response to a schedule, in response to operations, or the like. A request for the container may identify which generated container stored in the container registry 26 is to be executed. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like.

The master container node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. The master container node 62 may run an API server to handle requests and status updates received from the container nodes 30. In some cases, the master container node 62 may deploy containers to the container nodes 30 based on the desired state provided in the deployment configuration file 65. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX. EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that does not support an operating system (e.g., Linux) for receiving and/or implementing requested operations issued by the container orchestration system 24. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial automation system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

As mentioned above, the industrial control system 12 may access data from one or more of the OT devices 67, 71 (e.g., OT device 67 and/or one or more of OT devices 71) using symbolic data operations enabled by distributed IO products and/or other connected devices. The distributed IO products may include some of the circuitry described with reference to the industrial control system 12. Firmware of the OT devices 67, 71 may query a data source, or receive data from a data source based on the symbol, and store the retrieved datasets as instances of symbols with data type and formatting derived from template object instances that correspond to the symbol represented in the OT devices 67, 71. The data source may be a storage component that the industrial automation device is communicatively coupled to, such as a data repository that receives sensed data from one or more sensors. The OT devices 67, 71 may directly receive sensed data from one or more sensors and/or may correspond to a sensor that generates sensed data. This data received from the storage component or from the sensor may be stored in, or otherwise associated with, a template dataset to enable symbolic access of the data.

OT devices 67, 71 may store associated data into a template dataset associated with a template accessed via symbolic data methods may enhance overall industrial automation system 10 operation. Symbols may integrate at least some of data generated via standard devices and connected devices (e.g., legacy devices without symbolic data compatibility) and data generated via intelligent devices (e.g., devices with symbolic data compatibility) into a consistent format that may be accessed via an information model format that corresponds to the industrial automation system 10.

Storage 88 may include a master product data repository 90, device data templates 92, and embedded device objects 94. The storage 88 may be any suitable type of data storage device, such as a database, memory, or the like.

The master product data repository 90 may include product capability profiles, computer-aided design (CAD) models and attributes, digital twin models, augmented reality and/or virtual reality libraries, digital presence content management, persistence models, reporting, graphics, application enablement templates, or the like. The libraries, profiles, models, and so on included in the master product data repository 90 may each reference or operate based on the symbolic data between the master product data repository 90, the industrial automation devices 86, on-premise gateway device 80, off-premise edge gateway device 82, and/or any suitable on- and/or off-premise control and processing systems.

The device data templates 92 may include templates as device data models that may include one or more symbols and/or one or more templates. The device data templates 92 may be considered a template data definition and may indicate how to process and/or characteristics of template data relative to one or more templates and/or one or more symbols. Multiple template object instances may be associated together in one template instance when, for example, a parent device includes multiple nested devices. The device data templates 92 may harmonize and standardize different data models (e.g., different vendor data models) with awareness of context data for higher level consumption. Thus, the device data templates 92 may store or associate template object instances, data, and/or context data to each other.

The embedded device objects 94 may correspond to a data structure that associates collections of symbols to a device type. A template may define data types and formatting of data included in the data structure, and the template may be used to decode a set of data associated with the data structure. When registering an industrial automation device 86 to the industrial automation system 10, the industrial control system 12 may receive a data structure of the embedded device objects 94 corresponding to a type of the industrial automation device 86. Indeed, the industrial control system 12 may reference data in a symbol object instance received from the industrial automation device 86, such as identifier data, to match a type of the industrial automation device 86 to one or more of the embedded device objects 94. The industrial control system 12 may use the embedded device objects 94 to generate a template instance for the industrial automation device 86 in which future data generated and future contexts received may be populated into by the industrial control system 12 and/or by the industrial automation device 86. By using the embedded device object 94 that corresponds to the type of the industrial automation device 86, the industrial control system 12 may generate a template object instance consistent in structure with other template object instances generated previously for the same type of industrial automation devices 86.

The embedded device objects 94 may include data structures for logical uses, physical uses, and application uses. For example, data structures of the embedded device objects 94 corresponding to logical uses include flying start templates, motor control templates, variable boost templates, sleep/wake templates, and the like. Expected states that may be included in a template as contextual data for a motor drive include "Running," "Ready," "At Speed," "Active," "At Zero Speed," "Enable On," "Alarmed," "Connected," "Faulted," or the like. The embedded device objects 94 may correspond to power structure templates, motor data templates, predictive maintenance templates, encoder feedback templates, fan and/or pump templates, conveyor templates, hoist and/or lift/templates, and the like. These templates may be referenced when processing generated data. A template may indicate what data to expect in association with a motor, what data to expect in association with switchgear or power distribution equipment, and the like. In some cases, the embedded device objects 94 may correspond to one or more unit-specific templates.

Data associated with the various device-level systems may be accessed by other components of the industrial automation system 10 via the on-premise gateway device 80. The on-premise gateway device 80 may communicate on networks internal to the industrial automation system 10 with devices within the industrial automation system 10. The on-premise gateway device 80 may be locally connected to one or more industrial automation devices 86, the industrial control system 12, or both, and may communicate with the various devices using messages and/or control signals that employ some operational technology (OT) communication schemes, such as the common industrial protocol (CIP). The on-premise gateway device 80 may access symbols stored in the industrial automation devices 86 to process read requests as opposed to waiting to receive identifying information about each device and mapping the identifying information to the requested data for each device to read the requested data. The software application 96 may receive the symbols from the on-premise gateway device 80 and analyze data of the symbols to perform analysis, reporting, historical trending, or the like. The on-premise gateway device 80 may implement control loops based on the symbols and/or may analyze data received via the symbols in real time. Indeed, preparing data based on template object instances and symbol object instances may allow for more efficient processing, uniform comparisons between datasets generated by different devices, or the like. By using systems and methods to reference operational data in a manner using labels understandable to both machine and software, fewer look-up operations may be used to route data from a data source to a data consuming device, and thus fewer computing operations may be used to implement control and processing operations relative to other systems not using symbolic data operations.

Figure 4:
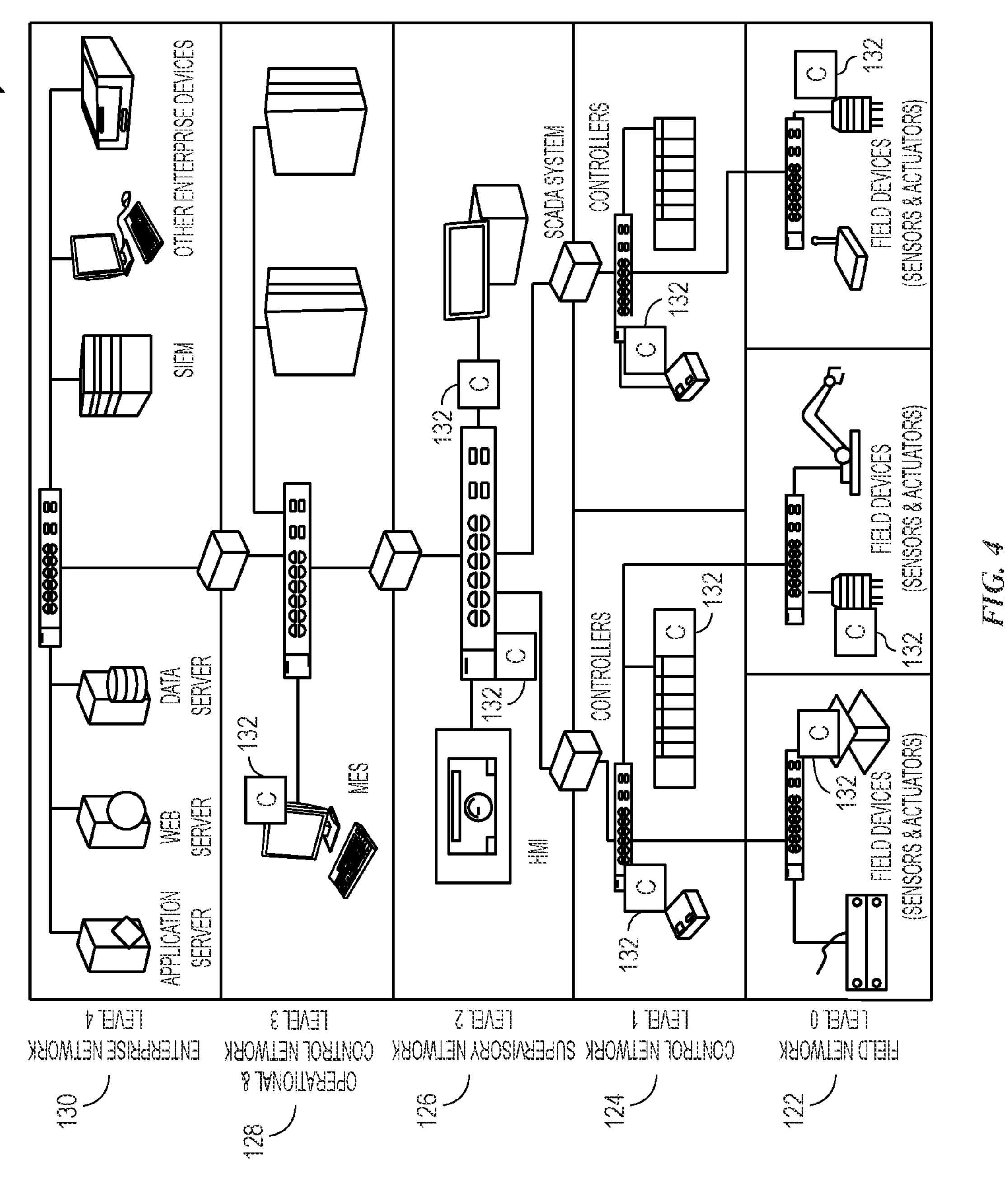
FIG. 4 is a diagrammatic representation of deployed container pods to various hierarchical levels of the industrial automation systems of FIG. 1, in accordance with an embodiment.

With the foregoing in mind, a container orchestration system 24 may determine to deploy one or more containers to one or more lower hierarchy devices of the industrial automation system 10. FIG. 4, for example, is a schematic diagram 120 of the various levels of computing associated with an example industrial automation system 10. The hierarchical levels, in which the industrial automation system 10 may operate, include a field network level 122 (e.g., level 0), a control network level 124 (e.g., level 1), a supervisory network level 126 (e.g., level 2), an operational and control network level 128 (e.g., level 3), and an enterprise network level 130 (e.g., level 4). Different control systems, controllers, software applications, devices, and computing systems may operate with each other within an enterprise to enable organizations to effectively control operations of components in the industrial automation system 10. For example, the physical process in which industrial components (e.g., machines) are employed to physically modify raw materials may be part of the physical process level, which may be controlled or monitored by components in an intelligent device level. The intelligent device level may include sensors, analyzers, actuators, and other instrumentation that may sense and manipulate the physical process. The industrial components at both the physical process level and the intelligent device level may be a part of the field network level 122. The field network level 122 involves the actual production process of transforming raw materials (e.g., grains, wheat) into products (e.g., cereal) as well as sensing and manipulating the production process within the industrial automation system 10 (e.g., food manufacturing plant). Containers deployed to the field network level 122 may be executed by local controller circuitry of respective sensors, actuators, OT device, or the like. It is noted that devices in higher network levels may be able to access data in lower network levels.

The control network level 124 may be positioned at a higher hierarchical level with respect to field network level 122. The control network level 124 may include controllers to provide supervising, monitoring, and controlling operations (e.g., continuous control, discrete control) for the physical process associated with the industrial components. When a container 132 is unable to be deployed to the field network level 122, sometimes the container 132 is deployed to a device in the control network level 124, which may be considered an edge device. The edge device running the container 132 may acquire data produced by devices, sensors, actuators in the field network level 122 and perform processing according to instructions associated with the container 132.

The supervisory network level 126 may be positioned at a higher hierarchical level with respect to the control network level 124 that regulates the controllers of the control network level 124. By way of example, the supervisory network level 126 may include real-time control hardware and software, HMI, programmable logic controller (PLC), supervisory and data acquisition (SCADA) software, and the like. The PLC may be an industrial solid-state computer that monitors inputs and outputs of the industrial automation system 10 and makes logic-based decisions for automated processes of the industrial automation system 10. Further, the SCADA may analyze real or near real-time data from industrial components and subsequently control the industrial components. Containers deployed to the supervisory network level 126 may have access to data acquired or generated by container 132 or devices in lower levels (e.g., field network level 122, control network level 124).

The operational and control network level 128 may be positioned at a higher hierarchal level with respect to the supervisory network level 126. The operational and control network level 128 may include manufacturing application system, which may any suitable IoT system that supports manufacturing processes. In some embodiments, the manufacturing application system may include manufacturing execution system (MES) or a manufacturing operations management (MOM) that manage production workflow to produce the desired products, batch management, laboratory, maintenance and plant performance management systems, data historians, related middleware, and the like. The MES and MOM may involve monitoring data with respect to various time frames, such as duration of communication between components, minutes, seconds, and the like. Containers deployed to the operational and control network level 128 may have access to data acquired or generated by container 132 or devices in lower levels (e.g., field network level 122, control network level 124, supervisory network level 126).

In particular, the MES may include a number of software and hardware components that operate together to monitor the operations of the various components (e.g., databases, servers, devices) that are used to perform the manufacturing operations. The infrastructure of the manufacturing applications system may include the software and hardware components that control the distribution of data and information between various components in the manufacturing application system level and other levels discussed above. By way of example, the components of the manufacturing application system may include a server, a database, a database server, an application server, network controllers, routers, interfaces, and the like. In addition, the components of the manufacturing application system may include software applications and processes that operate to control the flow of data and information between the various components employed by the manufacturing applications systems.

Positioned above the operational and control network level 128, the enterprise network level 130 may manage business-related activities of the manufacturing operation. The enterprise network level 130 may correspond to domain 98. In some cases, the enterprise network level 130 may establish production schedule, material use, shipping, and inventory levels to support the operations monitored by the components (e.g., databases, servers) in the operational and control network level 128. The enterprise network level 130 may also include application servers, web servers, data servers, security information and event management (SIEM), and other enterprise devices. Containers deployed to the enterprise network level 130 may have access to data acquired or generated by container 132 or devices in lower levels.

Devices in each of these levels may correspond to different hierarchical locations within the device hierarchy. Hierarchical locations may be generally arranged based on the levels. A hierarchical location of a device may indicate the physical or logical placement of the device within the industrial automation system 10 device hierarchy (e.g., represented via schematic diagram 120). When designing and/or managing control operations within the industrial automation system 10, the hierarchical locations may be considered since the hierarchical locations may impact latency, communication speeds, and/or power consumption.

As mentioned above, a container 132 deployed in the industrial automation system 10 may be a data collecting (e.g., data acquisition) process that monitors for specific data produced by one or more devices for a threshold duration of time or quantity of data, may perform one or more operations based on computer-implemented instructions associated or contained within the infrastructure of the container 132, or the like. Once a threshold amount of data is gathered or a threshold amount of time has been reached, or data is received from a data source, the container 132 may commence processing, analysis, and/or transmission of the data to be sent to a different device in a same or different level. In this way, some container 132 may be non-perpetual operations that have distinct start and end times. When a container 132 completes its operation, it is terminated and no further computing resources or memory are dedicated to that container 132 at the deployed device.

Deploying the one or more containers 132 may be based on a trigger event, such as receiving scheduling metadata, receiving a command from an industrial automation device, or detecting a device being commissioned in the industrial automation system 10, or the like. These examples and others are described herein. However, it should be understood that other deployment conditions or considerations may be used when determining whether to deploy a container 132 to another device in the hierarchy.

Figure 5:
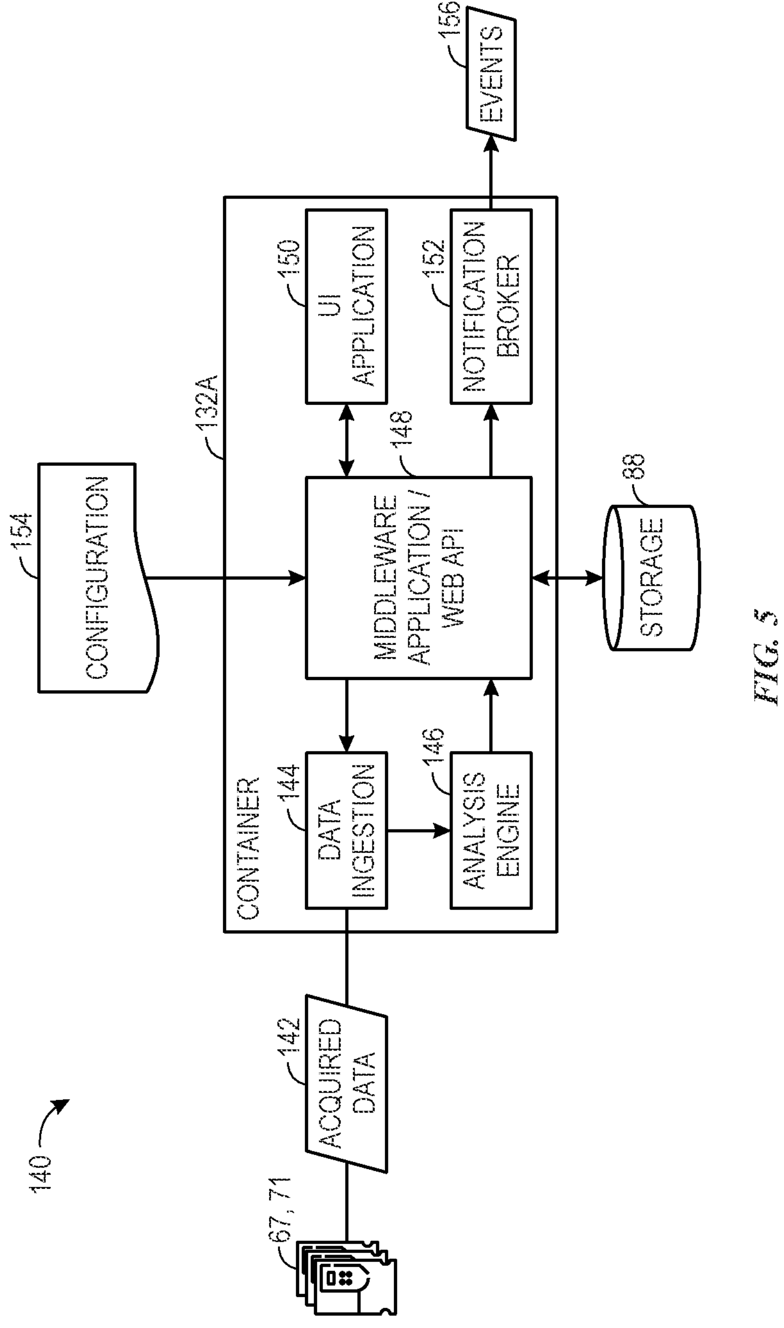
FIG. 5 is a diagrammatic representation of a container-based model predictive control (MPC) system deployed in one or more of the systems of FIG. 3, in accordance with an embodiment.

FIG. 5 is a diagrammatic representation of a container-based model predictive control (MPC) system 140 (e.g., a container-based monitoring application) deployed in one or more of the systems depicted in FIG. 3 and/or FIG. 4. Indeed, the MPC system 140 may be included in a container 132A, such as part of one of the containers 132 of FIG. 4 deployed in a suitable hierarchical level. In some cases, the MPC system 140 is an application accessible via the platform 108. In some cases, the MPC system 140 may be accessible via a management framework application provided via a cloud provider as part of a software offering.

The MPC system 140 may obtain data from the industrial automation system 10, such as data 142 acquired from or related to OT devices 67, 71 or other assets of the industrial automation system 10. The MPC system 140 may predict anomalies in an operation of the industrial automation system 10 based on the obtained data and an analysis operation. The analysis operation may involve one or more trained device models corresponding to the asset associated with the obtained data. When such an anomalous operation is detected, the MPC system 140 may generate a notification and/or data indicative of the detected operation (e.g., one or more event(s) 156). The notification may include a link to a graphical user interface to acknowledge the detection and/or label the detected anomalous operation as deemed appropriate.

To elaborate, various systems implemented via the MPC system 140 are described below. In one example, all functionality (except the storage 88) is intended to be hosted in a single container. However, it should be understood that in other systems it may be desired to host one or more portions or operations of the MPC system 140 in different containers, in one or more containers, in a combination of container-based operations and non-container operations, or the like. Benefits of using one container to deploy the MPC system 140 may be the ability to selectively use computing resources for the monitoring operation and to terminate the MPC system 140, freeing up the computing resources, once the monitoring operation ends or is idle. Other technical effects from using the container-based MPC system 140 may be described and relied upon herein.

The MPC system 140 may include a data ingestion component 144, an analysis engine 146, a middleware application 148 (that may enable a web-based API), a user-interface (UI) application 150, a notification broker 152, or the like. It should be understood that alternative, fewer, or additional systems or applications may be associated with the MPC system 140. The data ingestion component 144, the analysis engine 146, the middleware application 148, the UI application 150, and/or the notification broker 152 may correspond to separate processes built as respective binary or associated with respective instructions executable to perform the operations described herein. In this way, the respective processes may not be built into separate containers in some systems.

The middleware application 148 may receive a configuration 154. The configuration 154 may be a file provided to the container 132A providing the MPC system 140 via environmental variables. The middleware application 148 may read the configuration 154 via the web-based API, where the configuration 154 is passed in via environment variables. The middleware application 148 may write data of the configuration 154 to a database of the storage 88, as well as may initialize its various subcomponents based on the data of the configuration 154. The middleware application

148 may also operate as a data controller to aid in abstracting other components based on configurations and/or data accessible in the storage 88.

The data ingestion component 144 may receive the acquired data 142 from target automation devices, such as OT devices 67, 71. Once received, the data ingestion component 144 may format the acquired data 142 to meet protocol or formatting configurations of the middleware application 148 and/or the analysis engine 146. It is noted that the container 132A may be deployed to the edge gateway 82. Thus, the data ingestion component 144 may perform data processing operations on behalf of the edge gateway 82 for preparing the acquired data 142 into a protocol or format able to be handled by computing devices of domain 100.

Analytics operations performed by the middleware application 148 and/or the analysis engine 146 may use relatively high-speed data (e.g., greater than threshold) from target assets, such as OT devices 67, 71. The high-speed data may correspond to like trend data obtained at a sensing frequency greater than or equal to a threshold frequency of sensing. In some cases, the MPC system 140 may receive the data from one or more containers 132 deployed at compute surfaces of the target assets and/or in proximity to the target assets (e.g., deployed as close to the target asset as permitted or suitable). In some cases, the data ingestion component 144 may configure one or more common industrial protocol (CIP) objects at one or more target automation device, such as test points, to facilitate the collection of the data, where may be obtained at speeds higher when acquired closer to the target asset. In this way, high-speed trend data may be obtained at the target automation device.

The analysis engine 146 may receive ingested data from the data ingestion component 144 (e.g., the processed acquired data 142 output from the data ingestion component). The analysis engine 146 may perform one or more data manipulation operations on the ingested data. The data manipulation operations may include one or more normalization operations, filtering operations, sorting operations, sampling operations, splitting operations, or the like. Once processed, algorithmic logic of the analysis engine 146 may perform analytic operations based on the processed data to detect whether one or more anomalies are present in an operation or the target automation device. The algorithmic logic may be packaged as a library and may perform one or more machine learning-based operations on the processed data. In this way, processing to the ingested data performed by the analysis engine 146 may correspond to machine learning preprocessing operations. The machine learning preprocessing operations may include data cleaning operations, feature selection operations, feature scaling operations, data transformation operations, encoding operations, or the like. Indeed, any suitable analytic operation and/or processing operation may be performed via the analysis engine 146.

The UI application 150 may correspond to a "runtime" interface. The interface provided by the UI application 150 may enable a computing device of FIG. 3 to present a graphical user interface (GUI). The GUI may enable configuration of assets and drives to be monitored (e.g., as a target automation device), labeling and/or classifying of a detected anomalous operation, management of various aspects or configurations referenced by the MPC system 140, or the like. Furthermore, the notification broker 152 may generate and send one or more notifications to the GUI to indicate a detected anomalous operation via a visualization. Other methods may be used to notify via the notification broker 152 in response to an event 156 notification.

To elaborate, the notification broker 152 may be responsible for processing various events 156 generated in the MPC system 140 and then generating one or more events 156 based on indications of rules stored in the storage 88. An event 156 may include an amount of data less than an amount of data received as the acquired data 142. The notification broker 152 may transmit one or more events 156 to one or more computing devices (e.g., associated with the domain 98, associated with the industrial automation system 10) based on one or more indications of user profiles. Rules may associate a computing device to an indicated delivery method of notification. For example, a respective rule may indicate a relationship between a client device, a user profile, a system, a type of device, a computing device, or the like, and between a type of delivery method by which to send the notification. When the MPC system 140 is disposed in the cloud and/or provided by the computing device 76, the notifications may be sent by the notification broker 152 via electronic mail, text message, and/or another messaging application. When the MPC system 140 is provided by the computing device 74 and/or is accessed by a device without internet, the notifications may be sent by the notification broker 152 via a user-definable type (UDT), which may be mapped to one or more HMIs, alarms, control system operations, or the like. In this way, a computing device without internet connection may be sent event 156 notifications from the MPC system 140 based on the notification broker 152 writing the event 156 to the UDT as opposed to receiving the event 156 via an Internet-enabled connection or cloud-based connection. It is noted that the UDT may be used to provide a standard structure to write data to and read data from.

Although shown in FIG. 5 as corresponding to one MPC system 140, it should be understood that a single notification broker 152 may support multiple analysis engines and/or MPC systems 140. Indeed, the notification broker 152 and/or the storage 88 may be shared by one or more MPC systems 140, one or more containers 132, or the like. Furthermore, the one or more MPC systems 140, the one or more containers 132, and the like may be optionally operated on or executed on separate hardware. In one example, a computing device 74 may browse via an internet-enabled browsing operation to link to a reverse proxy and/or load balancer, which may be based on the middleware application 148. The reverse proxy and/or load balancer may communicatively couple to a scaled out UI involving two or more UI applications 150. The UI applications may respectively couple to the storage 88. Based on data provided from the different UI applications 150, separate data ingestion and analysis operations may occur based on separate instantiations on the data ingestion component 144 and the analysis engine 146. In this way, multiple MPC systems 140 may be scaled to support different parallel analysis operations while sharing some functionality among the various scaled systems. The separated data ingestion and analysis operations may correspond to respective device collections (e.g., one or more OT devices 67, 71 that may or may not overlap in groupings) and share a notification broker 152 responsible for communicating events 156 back to the computing device 74. In this way, different UI applications 150 may enable different configurations and/or data to affect separate data ingestion and analysis operations, which may share a notification broker 152 and storage 88. It is noted that the storage 88 in this example may be considered a shared storage and state manager, which may be written to by the various analysis engines 146 and read from by the notification broker 152 to coordinate the generation of the events 156 based on the different analysis results. As mentioned above, the notification broker 152 may provide notification via electronic mail, text message, or the like to one or more computing devices associated with the industrial automation system 10 and/or the domain 98.

Figure 6:
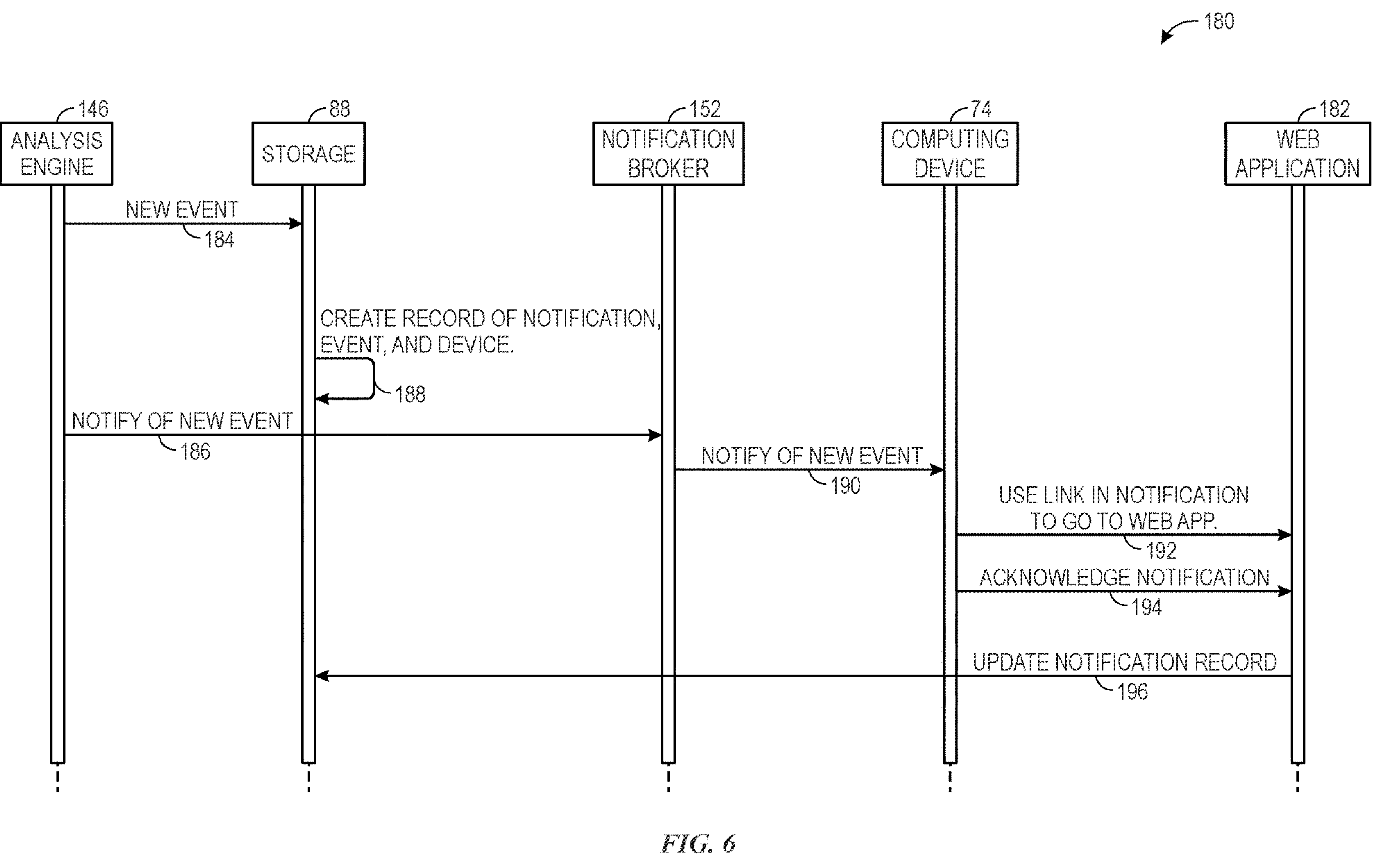
FIG. 6 is a flow chart of a method that the container-based MPC system of FIG. 5 may perform when detecting an event, in accordance with an embodiment.

To aid in visualization of operations of MPC system 140, an example notification sequence is illustrated in FIG. 6. FIG. 6 is a sequence diagram 180 illustrating the MPC system 140 detecting and generating an event 156. Operations illustrated in the sequence diagram 180 are associated with the analysis engine 146, the storage 88, the notification broker 152, the computing device 74, and a web-based application 182. It is noted that the sequence diagram 180 may not represent an exhaustive indication of described herein or able to be performed by the industrial automation system 10 based on and/or in conjunction with the MPC system 140.

With keeping descriptions of FIGS. 5-6 in mind, at operation 184, the analysis engine 146 may transmit an indication of a new event to the storage 88, which stores (at operation 188) the indication of the new event as a record. The indication of the new event may include metadata, such as an indication of a notification, asset identifier, device identifier, device type, a timestamp or the like, and thus the record in storage 88 may include some or all of the metadata. The analysis engine 146 may also transmit the indication of the new event at operation 186 to the notification broker 152. The notification broker 152 may notify, at operation 190, the computing device 74 in response to receiving the indication of the new event from the analysis engine 146. The notification broker 152 may notify the computing device 74 based on its indicated preference as the event 156. The notification broker 152 may adjust the notification method based on the metadata transmitted with the indication at operation 186. Once notified, the computing device 74 may, at operation 192, use a link in the notification from the notification broker 152 to navigate to the web-based application 182. In the web-based application 182, the computing device 74 may, at operation 194, transmit an input acknowledging the notification from the notification broker 152. Once acknowledged, the web-based application 182 may, at operation 196, update the notification record in the storage 88 that was previously generated at operation 188.

In some systems, operations of the storage 88, the notification broker 152, the computing device 74, and/or the web-based application 182 may occur at least partially in parallel, which may increase an efficiency and speed in which the computing device 74 is delivered the notification of the event. For example, operations 184 and 188 may be at least partially in parallel to operations 186, 190, 192, and/or 194.

In some systems, each detected anomaly by the analysis engine 146 may not trigger a new event at operation 184. The analysis engine 146 may perform additional monitoring rules and/or filtering operations before generating the new event at operation 184 in response to detecting the anomalous operation.

In the case that the computing device(s) 74 are not connected to the internet, notifications of operation 190 may be sent to a "application client" and/or a UDT, as described above. Furthermore, it is noted that these notification systems and methods may be used in combination with any suitable processing operation of the analysis engine 146 to identify and generate the indication of the new event at operation 184. For example, the analysis engine 146 may compare a baseline operation of an asset to a current operation of an asset to identify whether the asset is operating as expected or is anomalously operating. When the asset is deemed as anomalously operating, the analysis engine 146 may generate the indication of the new event at operation 184.

Keeping the foregoing in mind, systems and methods that improve analysis engine 146 monitoring operations are described herein. These systems and methods may use notification methods of FIG. 6 and/or the systems of FIG. 5 to detect anomalous operations.

To elaborate, some analysis and deviation detection operations may use machine learning operations. These machine learning operations may use a relatively long amount of learning time (e.g., greater than a desired threshold amount) to determine baselines and understand normal operating conditions of the asset and/or industrial automation system 10. These machine learning operations may use a dedicated training time period, as opposed to in situ training, and may be based on a controller identifying (or an another data source) define physical states. The physical state may correspond to a batch or material being processed (e.g., discrete/batch process). Using the dedicated training time period and/or receiving the indications of the physical states of operation being monitored may be undesirable due to potential for process disruption, delays, or additional communication or infrastructure being used to perform training and analysis operations.

With this in mind, the systems and methods described with reference to FIG. 7 may be used with in situ training of a machine learning device model, where processes may not be disrupted for training. Furthermore, these systems and methods may not use an indication of a physical state from the controller. These systems and methods may discern a physical state based on sensed data at a time of training, making the methods suitable for monitoring of continuous processes as well as discrete/batch processes.

Figure 7:
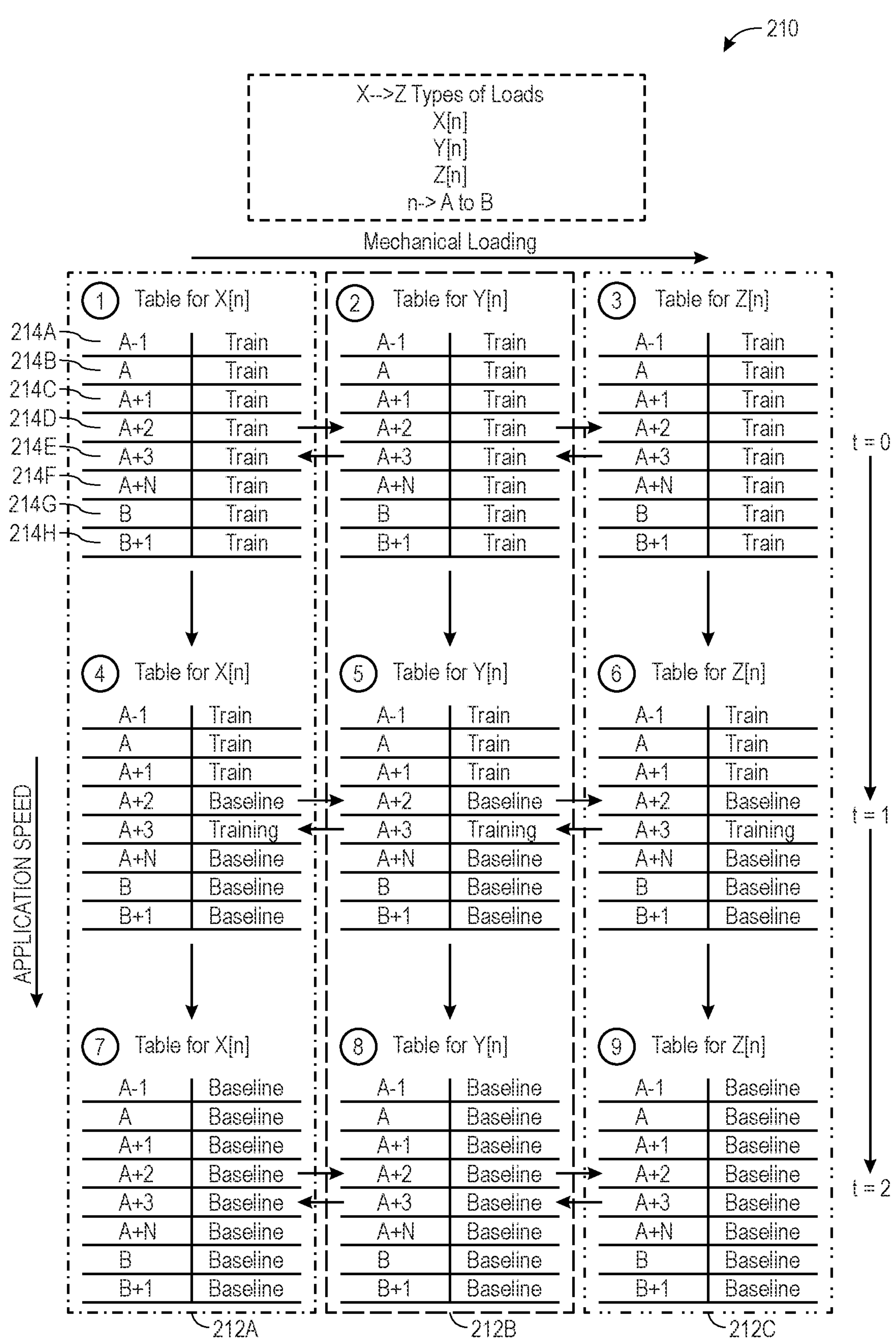
FIG. 7 is a diagrammatic representation of training operations performed by the container-based MPC system of FIG. 5 to train a device model for one or more loads and for one or more operational parameters, in accordance with an embodiment.

To elaborate, FIG. 7 is a diagrammatic representation 210 of hierarchical indexes of an asset over time (e.g., t=0 through t=2 where these may be durations of any amount of time) as training operations performed by the container-based MPC system 140 to train a device model of the asset, where the asset may be one or more OT devices 67, 71, or other suitable industrial device capable of being monitored. Hierarchical indexes associated with the asset may be stored in the storage 88 or another suitable memory. The hierarchical indexes may indicate different operations or performances of the when in different states 212 and when operated at different operational parameters 214. Each row of each table of the hierarchical indexes may correspond to a respective device model for the asset. The various respective device models may be trained based on in situ data associated with the asset to indicate a baseline or normal operation of the asset when operating in a respective state 212 at a respective operational parameter 214. For example, trained device models are illustrated as being associated with a "baseline" indication in the hierarchical index . . . . Before any training occurs, device models are illustrated as being associated with a "train" indication in the hierarchical index. When the MPC system 140 (e.g., via the analysis engine 146) is training the device model, the device models are illustrated as being associated with a "training" indication in the hierarchical index. The MPC system 140 may change, via the analysis engine 146, the "training" indication to the "baseline" indication in response to a threshold amount of normal operation data has been received.

To elaborate, the hierarchical indexes may correspond to one or more states 212 (state 212A, state 212B, state 212C) and one or more operational parameters 214 (operational parameter 214A, operational parameter 214B, operational parameter 214C, operational parameter 214D, operational parameter 214E, operational parameter 214F, operational parameter 214G, operational parameter 214H). It is noted that the asset may, overtime, handle the one or more different loads in states 212 (corresponding to X, Y, Z) at one or more different operational parameters 214 (corresponding to an array of operational parameters, n→A to B). For example, a pump at a first operational frequency (e.g., first operational parameter 214) to move a first load of a first viscosity (e.g., first state 212) may have a different operation than when it moves a second load having a second viscosity (e.g., second state 212) at the same first operational frequency (e.g., the first operational parameter 214). Application speed increasing may refer to increasing within among the operational parameter 214 ranges A−1 to B+1. Operation may further differ when the pump is used to move the first load (e.g., first state 212) at a second operational frequency (e.g., the second operational parameter 214). Thus, a combination of a respective state space and a respective operational parameter may be used to navigate the hierarchical index to access the device model. For example, when the asset is a motor, the respective state 212 of the motor may correspond to a physical characteristic of a load (e.g., thick material being moved via the motor may be a physically heavier load relative to a thinner or more viscous material) and the respective operational parameter 214 that the motor is operated at may be a rotation per minute (RPM) parameter. As the operational parameter changes, the respective state 212 space referenced changes. As the respective state 212 changes (e.g., when the load changes), the respective state 212 space referenced changes.

Although described in terms of three loads, it should be understood that an asset may correspond to one or more states 212 and one or more operational parameters 214. For example, a pump may move four different substances (e.g., liquid A, liquid B, water, liquid C) corresponding to the different states 212 (e.g., loads) and have four different pump signatures corresponding to the different substances, where for any one of the four different substances the pump may be operated at a different operating parameter corresponding to frequencies, and thus a lowest frequency (e.g., A−1), a middle frequency (e.g., A+2), or a highest frequency (e.g., B+1), or a frequency between those values (e.g., A, A+1, A+3, A+N, B).

Figure 8:
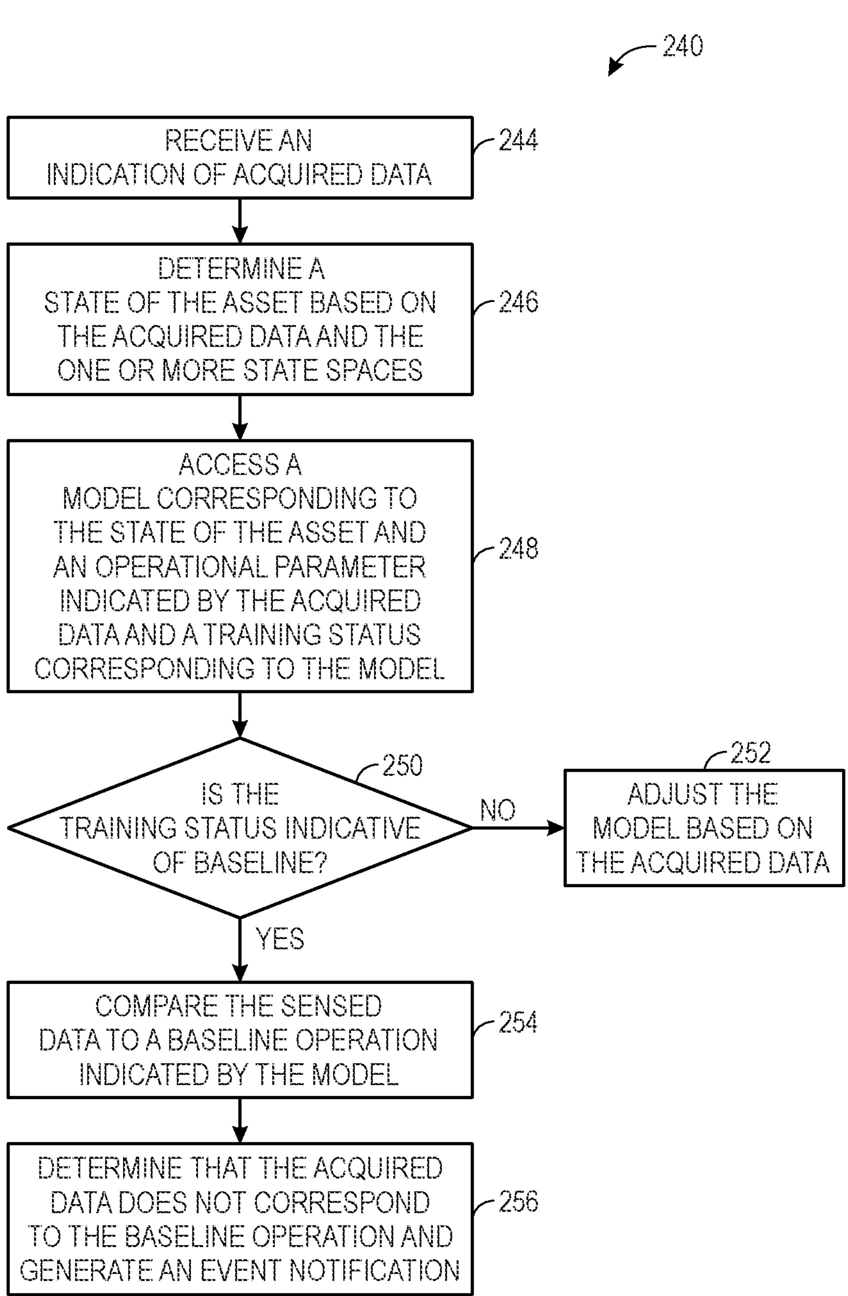
FIG. 8 is a flow chart of a method that the container-based MPC system of FIG. 5 may perform as part of the training operations of FIG. 7 and/or detection operations, in accordance with an embodiment.

By using systems and methods of FIGS. 7-8, a device model of an asset may be trained using data acquired in association with the asset operating at a normal operation in situ in the process. This may lead to various improvements in device behavior modeling, including increase speed of modeling, more accurate models since the modeling is occurring within the real process, or the like. Indeed, such training and monitoring operation operations may be discussed further with FIG. 8.

FIG. 8 is a flow chart of a method 240 that the container-based MPC system 140 may perform as part of the training operations illustrated via FIG. 7 and/or detection operations. Although the following description of the method 240 is described as being performed by the MPC system 140 via the analysis engine 146 and the notification broker 152, among other systems of FIG. 5, it should be understood that any suitable computing device and/or the industrial control system 12 may perform some or all of the operations described herein. In addition, although the method 240 is described in particular order, it should be understood that the method 240 may be performed in any suitable order.

At block 244, the MPC system 140 may receive an indication of the acquired data 142 via the data ingestion component 144. Thus, the acquired data 142 may indicate which of the one or more process states that the asset was operating in when the acquired data 142 was sensed or obtained. At block 246, the MPC system 140 may, via the analysis engine 146, determine a process state of the states 212 based on the acquired data 142.

At block 248, the MPC system 140 may, via the analysis engine 146, access a device model of the process state 212 determined at block 246. The device model may be selected based on which of the operational parameters 214 corresponds to the acquired data 142. In this way, the MPC system 140 selects the device model based on the determined process state and the operational parameter indicated by the acquired data 142. The selected device model corresponds to an indication of training status, such as an indication of "train," "training," or "baseline" from FIG. 7.

At block 250, the MPC system 140 may, via the analysis engine 146, determine a training status of the selected device model, which may indicate whether the selected device model is indicative of a baseline operation of the asset. When the selected device model is not indicative of the baseline operation, the acquired data 142 may be used by the MPC system 140 at block 252 to adjust the selected device model when the acquired data 142 indicates a normal operation of the asset. This may permit the selected device model to be trained while the asset remains in situ in the process and operating as intended in the process (e.g., not in a training mode). However, when the selected device model is indicative of the baseline operation, the MPC system 140 may compare the acquired data 142 to a baseline operation indicated by the device model at block 254. Based on the comparison, the MPC system 140 may determine whether a normal operation of the device model is represented by the acquired data 142. That is, whether the acquired data 142 is represented in the baseline operation indicated in the device model. When the acquired data 142 corresponds to a normal, baseline operation, the MPC system 140 may not generate an event 156 and/or may send the acquired data 142 for additional processing, like additional validation. However, at block 256, when the acquired data 142 corresponds to an anomalous operation, the MPC system 140 may generate the event 156 notification via the notification broker 152. The event 156 may trigger a validation operation to occur to enable labeling of the anomalous operation to occur. Over time, the analysis engine 146 may update the device model used based on the labeling of one or more anomalous operations.

In some embodiments, one or more device models may be retained or similarly referenced for replaced devices or after a device has been power cycled. Furthermore, although described herein as training an otherwise untrained set of device models of an asset, it should be understood that in some systems a partially trained device model may use in situ performance data to train the device model to that asset in that specific process. By reusing trained device models determined as still applicable to an asset in situ in a process and/or by using partially trained device models, a total time of training and/or bringing the replaced device online again after a device replace may be reduced.

Keeping the foregoing in mind, it may be desired to reintroduce data processed by the MPC system 140 back into the industrial automation system 10. Indeed, the MPC system 140 performing methods of FIGS. 7-8 and/or other data processing operations may generate data that otherwise may be unable to be reintroduced to the industrial automation system 10. From a network provisioning standpoint, the industrial automation system 10 may be relatively resilient to data being injected from a cloud-based or otherwise remote computing device of the domain 100, such as to protect against malicious actors or undesired operational adjustments. Systems and methods to enable this data to be introduced to the industrial automation system 10 are described herein.

To elaborate, the systems and methods described relative to FIGS. 9-13 may relate to introducing containerized applications that present themselves to the industrial control system 12 as physical IO and/or control systems. The containerized applications may present itself as a physical IO device and enable a local control system to perform cyclic data exchange, as described in FIGS. 9-11, or, in another case described in FIGS. 12-13, the containerized applications may present itself as another local control system to enable the physical control system to perform cyclic data exchange. The cyclic data exchange may be associated with class 1 messaging operations and/or produce/consume tag-based operations.

Figure 9:
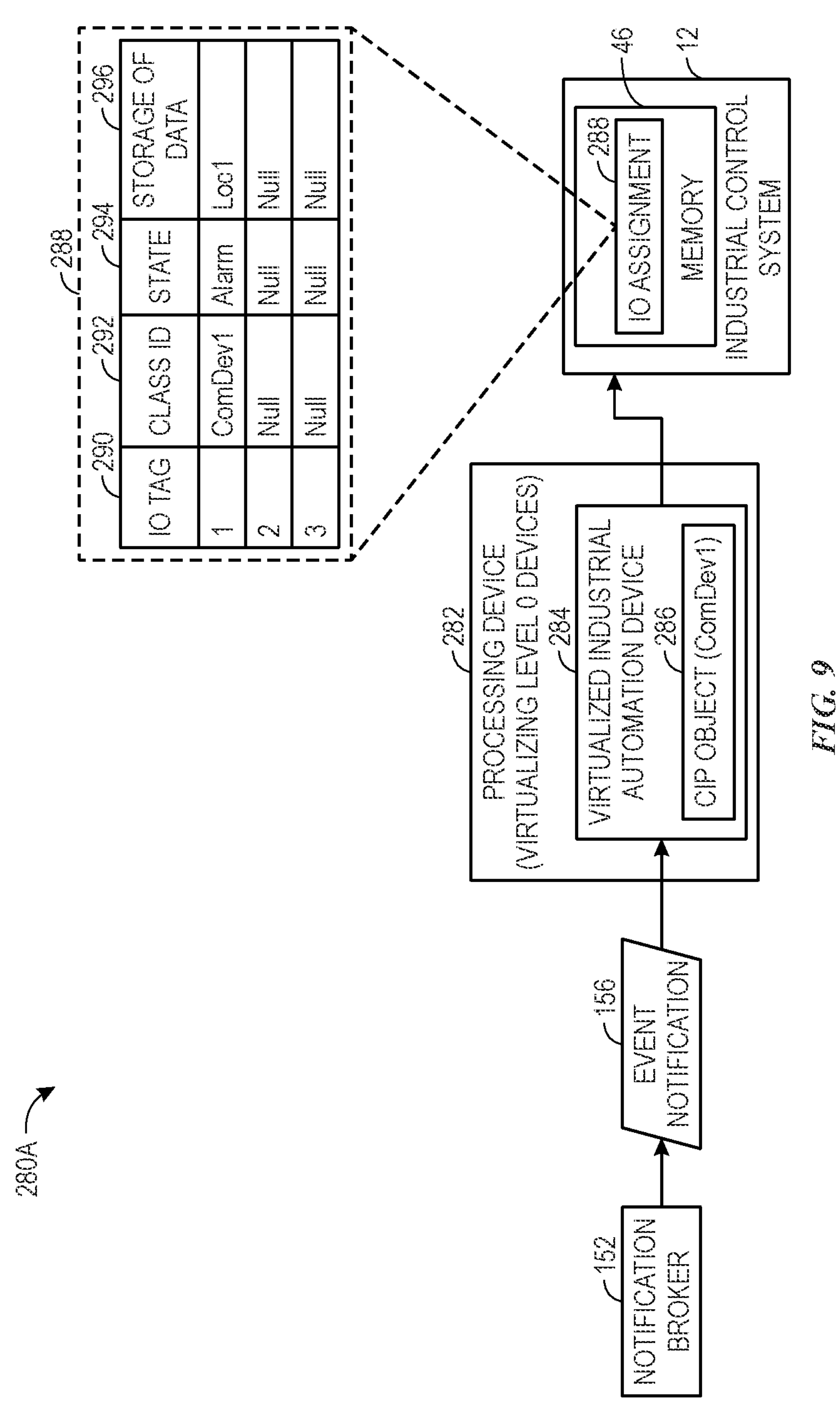
FIG. 9 is a diagrammatic representation of a first example data exchange path between a control network level or greater network computing device and the notification broker of FIG. 5 via a virtualized industrial automation device, in accordance with an embodiment.

Continuing on to described these virtualized industrial automation devices further, FIG. 9 is a diagrammatic representation of a first example data exchange path (e.g., example path 280A) between a control network level 124 (e.g., level 1 device) or greater network computing device and the notification broker 152 via a virtualized industrial automation device 284 (e.g., field network level 122 device, level 0 device). The control network level 124 or greater refers to any one of the hierarchical levels 124-130 of FIG. 4. FIG. 9 illustrates a first example of a data exchange path, which may be considered a lower network level to higher network level (and/or a different device in a same network level) communicative coupling. The first example of the data exchange path may communicatively couple devices located in the field network level 122 (e.g., industrial automation devices, sensors) and devices disposed in control network level 124 or higher (e.g., a SCADA system). The industrial control system 12 (e.g., IO module controller system) disposed in control network level 124 may interface between the higher level devices in levels 2 or higher, and lower level devices in the field network level 122. Thus, a virtualized industrial automation device 284 may be used as a virtualized input/output connection to the data exchange path via the industrial control system 12. For example, the MPC system 140 performing anomaly detection may generate data (e.g., event notification 156) during processing that is desired to be introduced into the industrial control system 12. The MPC system 140 may be located at a compute surface of an edge device or in the cloud. The MPC system 140 may write the generated data to the processing device 282 having the virtualized industrial automation device 284 in the field network level 122. The virtualized industrial automation device 284 may expose data via a common industrial protocol (CIP) object 286. The industrial control system 12 may include physical input and output terminals, and thus the CIP object 286 may be assigned to one or more input/output pins of the industrial control system 12. The industrial control system 12 may treat the generated data received from the CIP object 286 as if it is data coming from a physical sensor when the CIP object 286 exposes the generated data to the industrial control system 12 via the assigned input pins and/or output pins. The industrial control system 12 may then integrate the generated data received from the CIP object 286 as sensor data and send via its associated communicative couplings accordingly (e.g., send upstream to already established operations and/or devices).

When receiving data from the CIP object 286, the industrial control system 12 may reference IO assignments 288 stored in the memory 46. The IO assignments 288 may associate an IO tag indication 290, a class ID indication 292, a state indication 294, a storage location indication 296 of corresponding data, or the like in a data structure.

Figure 10:
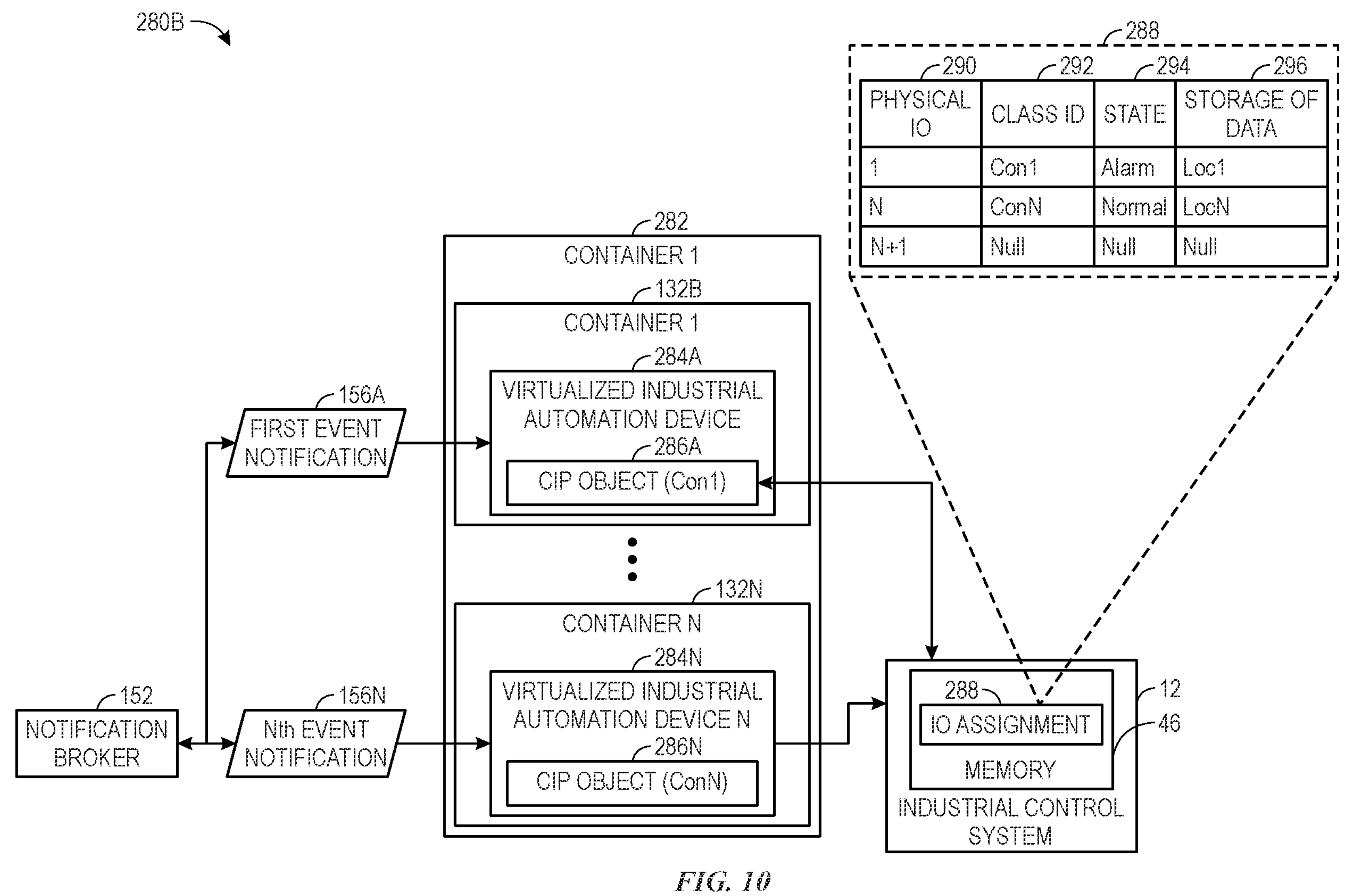
FIG. 10 is a diagrammatic representation of a second example data exchange path between a control network level or greater network computing device and the notification broker of FIG. 5 via a container-based virtualized industrial automation device, in accordance with an embodiment.

FIG. 10 illustrates a similar example path as FIG. 9, however, in FIG. 10, the processing device 282 may use one or more containers 132 to provide one or more virtualized industrial automation devices 284. Using containers 132 may enable the virtualized industrial automation devices 284 to be flexibly deployed or decommissioned responsive to operational conditions, end conditions being met, among other technical effects.

To elaborate, FIG. 10 is a diagrammatic representation of a second example data exchange path (e.g., example path 280B) between a control network level 124 or greater network computing device, in this case the industrial control system 12, and the notification broker 152 via one or more container-based virtualized industrial automation devices 284. As depicted, the processing device 282 virtualizing level 0 devices may include one or more containers 132 (e.g., container 132B through container 132N) to provide one or more virtualized industrial automation devices 284 (e.g., virtualized industrial automation device 284A through virtualized industrial automation device 284N) and/or to receive one or more event 156 notifications (e.g., events 156A through 156N) at one or more times (e.g., at one or more different times, at one or more at least partially overlapping time periods).

The industrial control system 12 may receive data from the virtualized industrial automation devices 284 via reference respective CIP objects 286 (e.g., CIP object 286A through CIP object 286N) that expose the data. Similar to FIG. 9, when receiving data from the CIP object 286, the industrial control system 12 may reference IO assignments 288 stored in the memory 46. The IO assignments 288 may associate an IO tag indication 290, a class ID indication 292, a state indication 294, a storage location indication 296 of corresponding data, or the like in a data structure.

Referring now to both examples depicted in FIGS. 9-10, the CIP objects 286 may be mapped to IO ports of the industrial control system 12. Thus, the industrial control system 12 may have one or more physical input terminals communicatively coupled to one or more CIP objects 286 via one or more physical output terminals coupled of the level 0 processing devices 282 virtualizing industrial automation devices 284. An event 156 notification may be generated external to field network level 122 or control network level 124 devices and transmitted to the virtualized industrial automation device 284 using any suitable method, such as those described with reference FIGS. 5-6. The virtualized industrial automation devices 284 may receive the event 156 notification and add the corresponding data to the CIP object 286 for consumption by the industrial control system 12 as if a respective virtualized industrial automation device 284 was a physical industrial automation device (e.g., OT device 67, 71) generating the data in a respective CIP object 286. The data stored in the CIP object 286 may have no persistence (e.g., without persistence) and may be rewritten over time as new event notifications are received from the notification broker 152, which may reduce an amount of memory and/or computing resources dedicated to providing the virtualized industrial automation device 284 overtime. Furthermore, the data stored in the CIP object 286 having no persistence may further emulate a level 0 device output, for example a sensor that acquires new data at a timing interval for the industrial control system to receive and process without storing or persisting the previously acquired data. The data stored in the CIP objects 286 may be able to have persistence of message if a respective virtualized industrial automation device 284 is implemented to interface with memory of its corresponding processing device 282.

In either example of FIGS. 9-10, to provide the containers 132, the processing device 282 may receive a container image corresponding to a deployed container (e.g., a respective of the one or more containers 132). The processing device 282 may execute the container image to spin up the deployed container and may provide the virtualized industrial automation device 284 based on the deployed container.

Furthermore, in either example of FIGS. 9-10, the industrial control system 12 may receive data exposed by the CIP object 286 via the physical input and output terminals. The industrial control system 12 may route or use the data based on an indication of terminal assignment, such as the IO assignment 288 tables shown in the FIGS. 9-10. The indications of IO assignment 288 may correspond to an IO tree that maps tags of the virtualized industrial automation devices 284 (which may correspond to that of the corresponding CIP object 286) to a respective IO terminal to which it is coupled. IO trees may standardize access of industrial automation system data and statuses between devices of different hierarchical levels, thereby improving an ability to process notifications and/or alerts of the various devices, among other benefits. The industrial automation system 10 may include one or more devices (e.g., devices described relative to FIG. 4) that reference the tags of the IO tree to obtain state information and/or identify where to retrieve stored data related to a device.

As one example, the indication of terminal assignment 288 may associate an IO tag or ID (e.g., ID tag indication 290) with a classification ID indication 292 of a respective CIP object 286, a state indication 294, and/or a storage location indication 296. The CIP object 286 may correspond to a tag exposed in a client (e.g., a respective virtualized industrial automation device 284) and may expose data that indicates an alarmed or other operational state of the client. Other parameters may be used. The classification ID indication 292 may correspond to an identifier of its associated CIP object 286 and be received via an input of a human machine interface (HMI), from user input to a GUI implemented in the level 4 devices, dynamically created based on an asset identifier and a device identifier, or the like. The state indication 294 may correspond to an operational state indicated via the CIP object 286. The virtualized industrial automation device 284 may update the operational state, and thus state parameter, in real time in response to outputs from the notification broker 152 and thus represent an alarm state, a normal state, or another state according to rules followed by the notification broker 152 and/or the virtualized industrial automation device 284. The storage location parameter may indicate where data received from the CIP object 286 is stored in the memory 46 or another storage external to the processing device 282, if at all. "Null" indications in the IO assignment 288 table may indicate placeholders in the IO tree and may correspond to otherwise unassigned inputs or outputs of the industrial control system 12.

Many suitable operations may be performed based on the tags and/or information of the indications of terminal assignments (e.g., the IO tree). For example, the industrial control system 12 may perform operations shown in FIG. 11.

Figure 11:
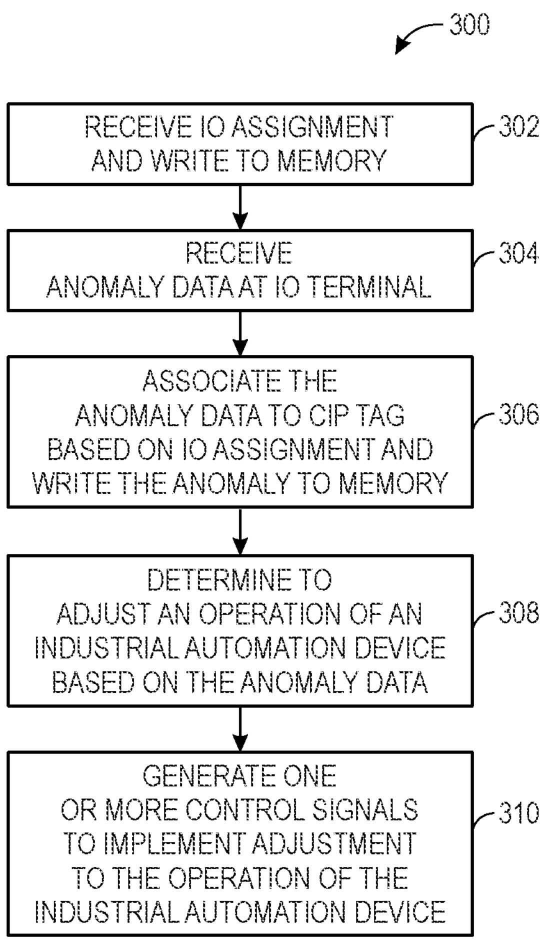
FIG. 11 is a flow chart of a method that an industrial control system of FIG. 3 may perform to determine and perform an adjustment to an operation of an industrial automation device based on anomaly data received from the notification broker of FIG. 5 using the first example data exchange path or the second example data exchange path of FIGS. 9-10, in accordance with an embodiment.

FIG. 11 is a flow chart of a method 300 that the industrial control system 12 may perform to determine and perform an adjustment to an operation of one of the OT devices 67, 71 based on anomaly data received from the notification broker 152 using the first example data exchange path or the second example data exchange path of FIGS. 9-10. Although the following description of the method 300 is described as being performed by the industrial control system 12 based on data received from the analysis engine 146 and the notification broker 152, among other systems of FIG. 5, it should be understood that any suitable computing device and/or control system may perform some or all of the operations described herein based on a variety of different types of data generated by a containerized application for injection into the industrial automation system 10 operations. In addition, although the method 300 is described in particular order, it should be understood that the method 300 may be performed in any suitable order. In this example, anomaly data is received, however it is noted that any suitable data could be received using these systems and methods.

At block 302, the industrial control system 12 may receive a respective IO assignment and write the IO assignment to the IO assignment 288 table. This may involve updating a row of the IO assignment 288 table stored in the memory 46. In other words, the industrial control system 12 may receive an IO assignment and write the IO assignment to the memory 46 as part of the indications of terminal assignment 288 (e.g., the IO tree). As noted above, the respective IO assignment may associate a physical input terminal of the industrial control system 12 to a physical output terminal of a processing device 282 that is virtualizing an industrial automation device 284 to provide data from a containerized application to the physical output terminal of the processing device 282, enabling data injection to the industrial automation system 10 control and processing operations.

At block 304, the industrial control system 12 may receive anomaly data at the physical input terminal mapped via the respective IO assignment from block 302. The industrial control system 12 may receive the anomaly data via the IO terminal assigned to a virtualized industrial automation device 284 at block 302. The anomaly data may be raw data generated by and/or processed by a containerized application, event 156 data generated by the notification broker 152, or the like. The virtualized industrial automation device 284 may receive data acquired by or generated by the deployed container 132, such as the container-based MPC system 140. The deployed container 132 may expose the data acquired or generated via symbol and template data access methods, via direct messaging operations, by exposing the data via consumer/producer data access methods, or the like. Indeed, any suitable data transmission or communication method may be used to communicate data between the virtualized industrial automation device 284 and the deployed container 132. In this way, the anomaly data may be generated by the container-based MPC system 140 and transmitted to the virtualized industrial automation device 284 as opposed to being routed directly to the industrial control system 12, which may enable data injection to the industrial automation system 10 control and processing operations with relatively less reprogramming or computing accommodation to the generated data from the container operations.

At block 306, the industrial control system 12 may associate the anomaly data to the class ID 292 identified via the IO assignment. In some cases, the industrial control system 12 may write the anomaly data to the memory 46 and update the storage location indication 296 to the memory location that stores the written anomaly data. In other words, the industrial control system 12 may associate the anomaly data to a common industrial protocol (CIP) tag based on the IO assignment from block 302 and write the anomaly to the memory 46. The industrial control system may overwrite existing data saved at the memory location corresponding to the CIP tag but from an earlier time. When overwriting the originally stored data, the storage location indication 296 may not change. Storing the anomaly data may enable the industrial control system 12 or higher leveled network devices to perform additional monitoring or processing operations on the container-generated anomaly data, such as historical data monitoring or trend identifying analysis.

At block 308, the industrial control system 12 may determine to adjust an operation of a respective OT device 67, 71 based on the anomaly data and, at block 310, may generate one or more control signals to implement the adjustment to the operation. The respective OT device 67, 71 may correspond to the processing device 282 which executes and provides the virtualized industrial automation device 284. In some cases, the respective OT device 67, 71 is associated with the asset monitored by the MPC system 140 when generating the anomaly data. However, any suitable OT device 67, 71 or process operation may be determined to be adjusted and accordingly adjusted. Indeed, the anomaly data may correspond to an operation upstream or downstream from the respective OT device 67, 71 and the industrial control system 12 may reactively or proactively determine to adjust the respective OT device 67, 71 based on the anomaly data and the operation. The industrial control system 12 may respond to the anomaly data based on control rules, thresholds, settings, or the like used to perform other control operations based on other data received from non-virtualized industrial automation devices (e.g., OT devices 67, 71). Indeed, the industrial control system 12 may determine an adjustment to an operation of an OT device 67, 71 based on the anomaly data or perform another communication or control operation that involves transmitting the anomaly data or an alert generated based on the anomaly data to one or more other devices associated with the industrial automation system 10. The industrial control system 12 may generate one or more control signals to implement this operation performed based on the data received at block 304.

Example systems and methods of FIGS. 9-11 introduced cloud-orchestrated containerized applications, like the MPC system 140, that present (or coordinate with other containerized applications that present) as physical IO or local control systems to the industrial control system 12. Since the containers 132 may present as a physical industrial automation device (e.g., OT devices 67, 71) to another control system, like the industrial control system 12, the control system may perform cyclic data exchange with the container 132 and/or may transmit the data according to previously deployed control operations and/or monitoring operations, enabling relatively seamless integration of the container-generated data with existing process technologies and operations.

Figure 12:
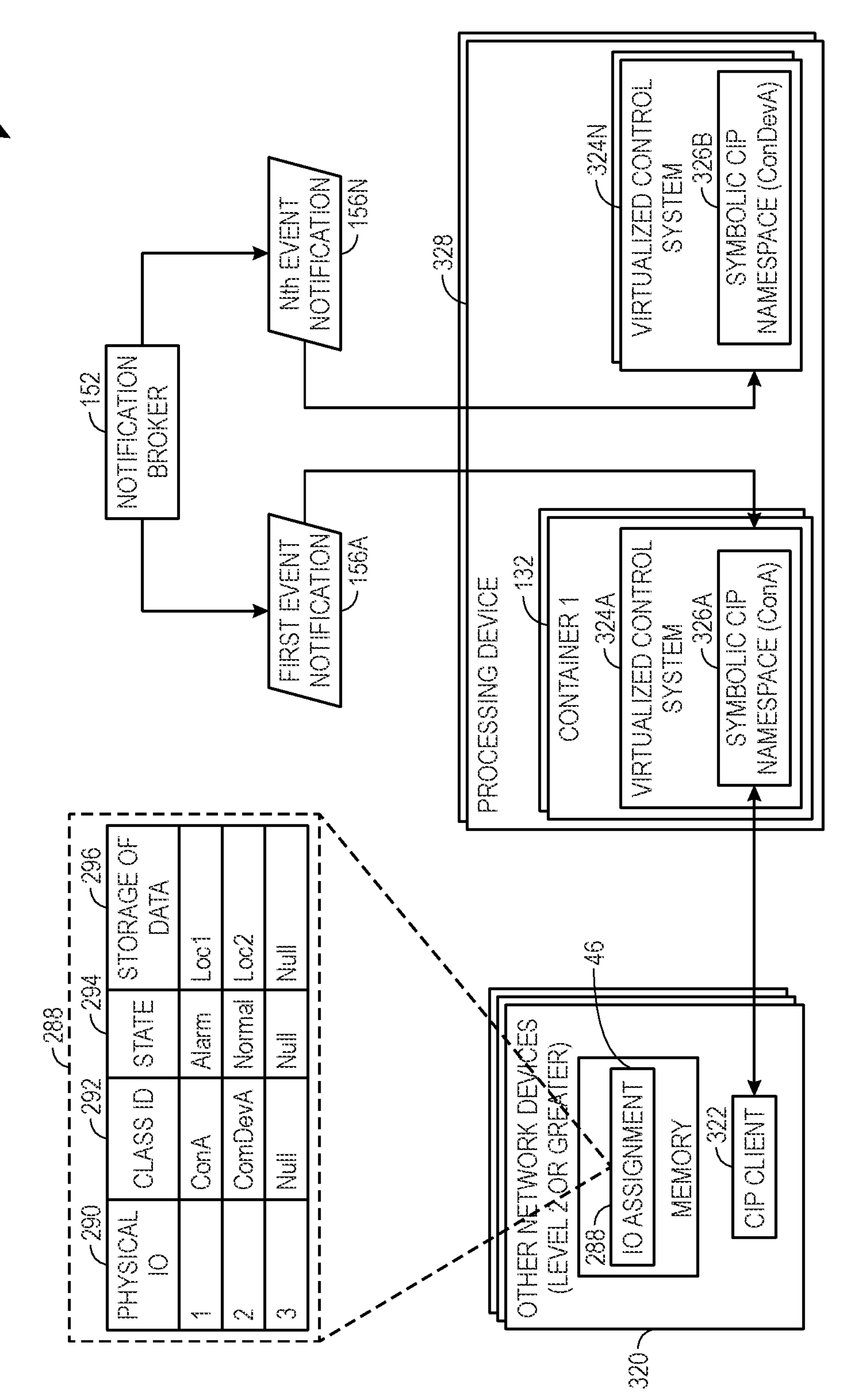
FIG. 12 is a diagrammatic representation of a third example data exchange path between a control network level or greater network computing device and the notification broker of FIG. 5 via a virtualized industrial control system, in accordance with an embodiment.
Figure 13:
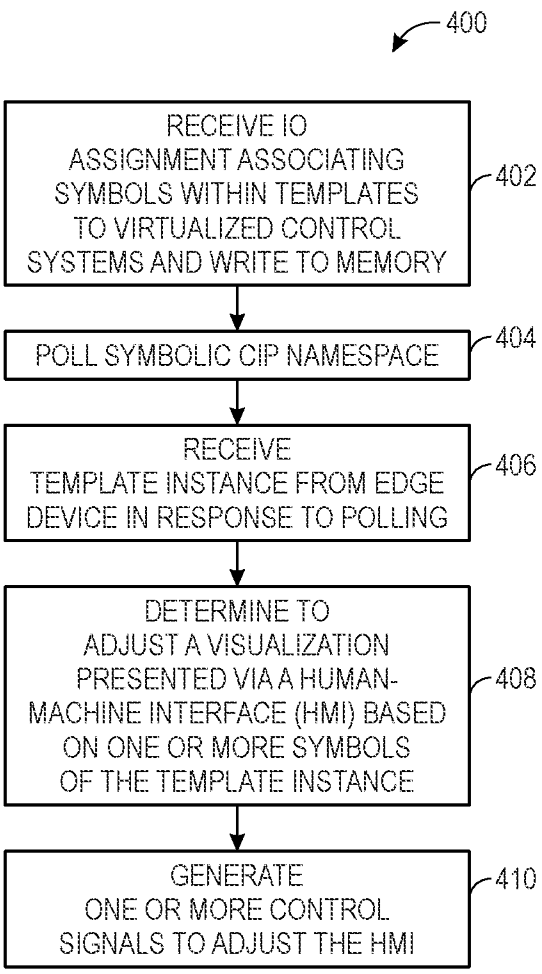
FIG. 13 is a flow chart of a method that the level 2 or greater network computing device of FIG. 12 may perform to generate a control signal based on a symbolic common industrial protocol (CIP) namespace updated based on anomaly data received from the notification broker of FIG. 5 using the third example data exchange path of FIG. 13, in accordance with an embodiment.

With the foregoing in mind, FIGS. 12-13 are similar to systems and methods of FIGS. 9-11 and are directed toward a second example data exchange path. Indeed, a second system may use a virtualized namespace to represent itself as a symbolic CIP namespace, which could be consumable at a higher hierarchical level as if it was the industrial control system or local control system itself. The namespace could be a CIP object deployed in a level 2 edge device, processing device implementing a virtualized control system (e.g., similar to the processing device shown in FIGS. 9 and 10). Data could be written to the namespace and consumed as if it was a control system itself via being exposed as a CIP object using similar IO assignments like described above in FIGS. 9-11. Using these systems and methods may enable data to be exposed directly via existing couplings to the other devices (e.g., HMIs, SCADA systems, web servers) associated with a same or different network level of FIG. 4. In some cases, the container 132 generates symbolic data represented via one or more symbols, one or more template instances, or both. The symbolic data may be consumed by other devices or common industrial protocol (CIP) clients (e.g., Linux) as if the industrial control system itself was generating the symbolic data via the symbolic common industrial protocol (CIP) namespace. The event notifications received at the CIP object may also have no persistence of message to emulate data generation of some industrial automation devices (e.g., sensors).

To elaborate, the second data exchange path may be a communicative coupling between one or more industrial control systems 12 disposed in the control network level 124 (e.g., level 1) and devices disposed in operational and control network level 128, the supervisory network level 126, and/or the enterprise network level 130. In some cases, an edge device disposed in the supervisory network level 126 may facilitate communication between the control network level 124 and the higher levels 126, 128, and 130. Similar IO assignments and IO tree methods may be used for systems of FIGS. 12-13 as used in FIGS. 9-11, and thus these descriptions may be relied on herein.

FIG. 12 is a diagrammatic representation of a third example data exchange path (e.g., example path 280C) between network devices 320 associated with network levels 126, 128, and 130 and the notification broker 152 based on one or more common industrial protocol (CIP) clients 322 and one or more virtualized control systems 324 associated with control network level 124. The virtualized control systems 324 may expose data to one or more network devices 320 via a symbolic CIP namespace 326. One or more processing devices 328 may provide the one or more virtualized control systems 324. A respective processing device 328 may be associated with the supervisory network level 126 and/or may be an edge device disposed between different network levels of FIG. 4.

As shown in FIG. 12, one or more symbolic CIP namespaces 326A may be deployed via one or more containers 132 executed via the processing device 328, one or more symbolic CIP namespaces 326B may be deployed directly via the processing device 328, or a combination of systems may be used. Indeed, one or more containers 132 may be executing on the processing device 328 that transmit data into the industrial automation system 10, where the injected data may be received from the notification broker 152 as part of an event 156 notification. To provide the containers 132, the processing device 328 may receive a container image corresponding to a deployed container (e.g., a respective of the one or more containers 132). The processing device 328 may execute the container image to spin up the deployed container and may provide the virtualized industrial control system 324 based on the deployed container. In some cases, a container 132 may be deployed until reaching an end condition that causes removal of one or more of the containers 132 from being provisioned.

The one or more network devices 320 may operate according to methods shown in FIG. 13. To elaborate, a respective network device 320 may receive an IO assignment associating symbols within templates to virtualized control systems and write the assignment to the IO assignments 288 in the memory 46. The network device 320 may determine to poll symbolic CIP namespaces 326 based on the IO assignment 288 to obtain data exposed via the symbolic CIP namespaces 326. The network device 320 may receive a template instance from the processing device 328 via physical terminals in response to the polling. The processing device 328 may operate the virtualized control system 324 to expose symbolic data to one or more input terminals of the network device via one or more output terminals of the processing device 328. Data exposed via the terminals may be transmitted serially or in parallel and any suitable configuration may be used for the system.

One or more symbols of the template instance may be used by the network device 320 to determine to adjust another operation, such as adjust a visualization presented via an HMI. For example, the HMI may be updated to convey a status change or to communicate a result of a processing operation indicated via the one or more symbols. In some cases, anomaly data generated by the MPC system 140 and transmitted as the event 156 may be used to update one or more symbols stored in the template instance, such as to indicate an alarm state of an asset associated with the template instance. To implement the adjustment, the network device 320 may generate (or instruct the industrial control system 12 to generate) one or more control signals and/or data signals. In the above example, the data signals may be used to adjust the HMI. Although the HMI visualization example is described herein, it should be understood that data received at the virtualized control system 324 may be used by the one or more network devices 320 to perform a variety of operations described herein, such as in reference to FIG. 4.

Referring now to FIG. 13, FIG. 13 is a flow chart of a method 400 that the network device 320 may perform to generate a control signal based on a respective symbolic CIP namespace 326 updated based on anomaly data (e.g., respective event 156 notification) received from the notification broker 152 using the third example data exchange path of FIG. 13. Although the following description of the method 400 is described as being performed by the network device 320 based on data received from the analysis engine 146 and the notification broker 152, among other systems of FIG. 5, it should be understood that any suitable computing device and/or control system may perform some or all of the operations described herein based on a variety of different types of data generated by a containerized application for injection into the industrial automation system 10 operations. In addition, although the method 400 is described in particular order, it should be understood that the method 400 may be performed in any suitable order. In this example, anomaly data is received, however it is noted that any suitable data could be received using these systems and methods.

At block 402, the network device 320 may receive an IO assignment associating a respective symbolic CIP namespace 326 to respective outputs from the processing device 328, and respective inputs to the network device 320. The network device 320 write the IO assignment to the IO assignment 288 table. These operations may involve mapping respective symbols of an expected template instance to one or more data consumers associated with the network device 320 and/or the CIP client 322.

At block 404, the network device 320 may poll the symbolic CIP namespace 326 associated with the IO assignment from block 402 and, at block 406, may receive a template instance from the processing device 328 in response to the polling. The virtualized control system 324 may expose an event 152 notification via the symbolic CIP namespace. In some cases, the virtualized control system 324 does so in response to polling of the network device 320. Exposing the event 152 notification may provide symbolic data to one or more input terminals of the network device 320 via output terminals of the processing device 328. One or more CIP clients 322 of the network device 320 may access data corresponding to symbols of the template instance and incorporate the data from the higher level computing device into the existing data exchange pathways as if a physical control system generated the data. Although described in terms of symbolic data operations, in some cases, CIP namespaces may be used without symbolic data access. Benefits of using symbolic data operations may include relatively easier integration of the data from the containerized application, like the MPC system 140, into upstream data handling operations without conversion operations to convert data into symbols and template instances (as may be used in CIP namespaces without symbolic data access when used with systems that use symbolic data operations), which may be based on the symbolic data operations.

At block 408, the network device 320 may determine to adjust a visualization presented via a human-machine interface (HMI) based on one or more symbols of the template instance and, at block 410, may generate one or more control signals to adjust the HMI. The network device 320 may update the visualization based on the data represented via the one or more symbols and/or based on the one or more symbols themselves. The event 156 from the notification broker 152 may indicate an anomalous operation and the network device 320 may update the visualization to communicate the anomalous operation, an alarm state corresponding to the anomalous operation, or the like.

In some cases, the processing devices 282, 328 may temporarily deploy the containers 132, which may provide the virtualized industrial device (e.g., virtualized industrial automation device 284, virtualized control system 324) for a non-perpetual duration of time. To do so, one or more processing devices 282, 328 may receive one or more container images corresponding to one or more deployed containers, such as from the container orchestration system 24. The one or more processing devices 282, 328 may execute the one or more container images to spin up the one or more deployed containers in response to receiving it. Once executing and providing one or more virtualized industrial devices, the one or more processing devices 282, 328 may generate an input/output (IO) assignment that associates one or more of its output terminals to one or more input terminals of one or more network devices (e.g., industrial control system 12, network devices 320) and the virtualized industrial device. The one or more network devices may receive data exposed by one or more virtualized industrial devices based on the IO assignment. The one or more virtualized industrial devices may continue to expose data received from other containerized applications for a duration of time. At some point in time, the one or more processing devices 282, 328 may determine to stop providing one or more of the virtualized industrial devices based on one or more end conditions being met, a trigger event occurring, or both and, in response to the determination, may terminate one or more of the containers being used to provision of one or more of the virtualized industrial devices. In response to terminating the container, the one or more processing devices 282, 328 may generate an input/output assignment that dissociates the one or more output terminals with the one or more input terminals and the one or more of the virtualized industrial devices (now terminated). Dissociating the output terminals from otherwise terminated containerized applications may free up computing resources and physical resources for future operations and deployed containers.

In some cases, the industrial control system 12, the network device 320, or another suitable processing device, may identify and implement a remedial action based on data received from a containerized application, such as described in reference to FIGS. 9-13. To do so, the industrial control system 12 may diagnose a condition of the device and/or of one or more portions or processes of the industrial automation system 10 based on the collected data and/or an operational signature determined based on the processing of collected data. For example, the industrial control system 12 may as a result of the analysis of the collected data and/or the motor signature, may identify a condition of the device (e.g., faults, out of balance, misalignment, worn bearings, rotor bar damage, load issues, dynamic eccentricity, static eccentricity, cavitation, component wear, machine jams, capping anomalies, contamination, a broken seal, a malfunctioning sensor, the presence of malware, ransomware, or spyware, an oil leak, dirty oil, a blown fuse, out of date firmware or software) based on the received data and/or an operational signature determined based on the processing of received data. When the received data is the anomaly data or event 156 from the MPC system 140, the industrial control system 12 may use the anomaly data as an indication of an alarm state, which may contribute to a diagnosis being made for a process that the respective asset is associated in, a portion of the industrial automation system, or the like. The diagnosis may be made using machine learning, historical data, workflows, decision trees, lookup tables, or some combination thereof. An identified remedial action may be determined to address the diagnosed condition or the motor. The remedial actions may be determined via a lookup table, a script, an algorithm, a machine learning model, accessing a database, following a workflow or decision tree, analysis of historical data, and so forth, and may involve the container orchestration system 24 coordinating a remedial control operation with the industrial control system 12, updating an indication of a maintenance schedule to schedule one or more recommend remedial maintenance actions, or the like. The remedial actions may include, for example, generating a control signal to adjust an operating parameter (e.g., speed of rotation, frequency of operation, power), recommending a maintenance action like replacing and/or servicing bearings, clearing a machine jam, adjusting fasteners, replacing a seal, or the like, performing a maintenance operation like performing a calibration operation on a component, updating software/firmware, and so forth. In some systems, remedial actions may be automatically implemented by one or more network devices of FIG. 4. For example, certain remedial actions may be pre-approved or otherwise indicated in metadata for automatic implementation. In some systems, the one or more network devices may propose one or more remedial actions to a user for approval/selection before implementation. Further, other remedial actions (e.g., replacing a seal, replacing a component, clearing a machine jam, replacing a hose) may be recommended to be performed and/or automatically added to maintenance records to be performed. The remedial action may include the industrial control system 12 instructing the container orchestration system 24 to deploy one or more containers 132 to further diagnose a condition or to attempt to remedy. If the condition persists or is otherwise unresolved, some or all of the operations to deploy containers 132 may be repeated with a different diagnosis and/or remedial action. After the condition has been resolved (e.g., a confirmation is received that the condition has been resolved and the OT device is operating as expected) or another condition is met, the container 132 may be spun down or otherwise stopped so the resources utilized by the container 132 may be made available for other functions.

It is noted that the above descriptions included the processing device 282 and the processing device 328 respectively virtualizing the various industrial devices. It should be understood that the processing devices 282, 328 may refer to a same device (e.g., computing device, industrial control system, processor, processing circuitry). Furthermore, the processing devices 282, 328 may be capable of providing both the virtualized industrial automation device 284 and the virtualized control systems 324 at one or more times, different or overlapping. Indeed, the processing devices 282, 328 may provide one or more virtualized industrial automation devices 284, one or more virtualized control systems 324, or a combination of the two, for any suitable duration of time that may or may not be overlapping relative to another provision of the virtualized industrial automation device 284 and/or the virtualized control systems 324.

The present disclosure is generally directed to industrial automation systems that implement container technologies. A container-based anomaly detection system is described herein that may generate data and/or event notifications to be introduced into industrial control system operations. Furthermore, containers may be deployed in different levels to acquire or generate different granularities of data to be introduced into industrial automation processing operations. It may be desired to have systems and methods to introduce this container-originated data into the industrial automation system. To do so, computing devices may be virtualized at compute surfaces to provide a lower level input for data into the industrial automation system from which higher level devices may consume and use the data. Indeed, technical effects of the present disclosure include increasing efficiency of control operations by enabling higher level devices to generate data and expose the data at lower levels of devices for consumption into established data exchange pathways. Systems and methods are discussed herein that enable a container operated on a higher hierarchal level device to generate data and send the data to a lower hierarchal level device. In a first example, the lower level device may store the data in a CIP object associated with a virtualized industrial automation device. A control system disposed in a hierarchical control network level 124 may have physical IO terminals that are able to be assigned to read the data from the CIP object as if the virtualized industrial automation device was a physical device. In another example, a virtualized control system operating on a computing device may receive data from a higher leveled computing device (e.g., associated with control network level, supervisory network level, operational and control network level, and/or enterprise network level) and store the data. One or more CIP clients may access the data and incorporate the data from the higher level computing device into the existing data exchange pathways as if a physical control system generated the data. The CIP clients may do so based on a symbolic CIP namespace accessed by both the virtualized control system and the CIP clients. Either of these examples may involve provisioning the virtualized industrial automation device and/or control system by using containers. By operating according to one or both of these examples, industrial automation system operation may improve efficiency of data handling by reducing installation times and reducing complexity of systems when using existing data exchange pathways to apply data enhanced with additional higher level analysis to lower level systems. Furthermore, by deploying one or more of the systems and methods in association with programs operated within containers, the industrial automation system may better manage computing resources. Indeed, by deploying non-perpetual containers that terminate based on time or data acquisition parameters, computing resources may be deployed more efficiently in the industrial automation system as computing resources may not be tied up in otherwise inactive or unused data acquisition operations. Other benefits are described and/or suggested herein. Accordingly, use of the disclosed techniques may improve product quality, process quality, and efficiency within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:

an industrial network device comprising one or more input terminals, wherein the industrial network device is configured to perform one or more operations in association with an industrial automation system based on symbolic data received via the one or more input terminals, wherein the one or more input terminals are associated with a symbolic common industrial protocol (CIP) namespace and one or more output terminals of a virtualized control system based on an input/output (IO) assignment; and processing circuitry comprising the one or more output terminals communicatively coupled to the one or more input terminals, wherein the processing circuitry is configured to:

provide the virtualized control system communicatively coupled to the industrial network device via the one or more output terminals;

receive an event notification from a first container provided by one or more computing devices external to the industrial automation system;

operate the virtualized control system to expose the event notification via the symbolic CIP namespace configured to provide the symbolic data to the one or more input terminals based on the event notification and the IO assignment; and transmit the symbolic data corresponding to the virtualized control system via the one or more input terminals to the industrial network device.

2. The system of claim 1, wherein the industrial network device is configured to:

receive the symbolic data from the processing circuitry;

determine to adjust a visualization presented via a human-machine interface (HMI) based on the event notification; and generate one or more control signals to adjust the HMI based on the determination to adjust the visualization.

3. The system of claim 1, wherein the processing circuitry is configured to provide the virtualized control system at least in part by providing a container performing operations to provide the virtualized control system.

4. The system of claim 1, wherein the processing circuitry is configured to operate the virtualized control system to expose the event notification in response to the industrial network device polling the symbolic CIP namespace.

5. The system of claim 1, wherein the first container is configured to:

receive acquired data from a sensor of a target device;

perform a processing operation on the acquired data;

generate the event notification based on the processing operation; and transmit the event notification to the processing circuitry without transmitting the acquired data.

6. The system of claim 5, wherein the acquired data comprises a first amount of data, wherein the event notification comprises a second amount of data, and wherein the second amount of data is less than the first amount of data.

7. The system of claim 1, wherein the industrial network device is configured to perform the one or more operations based on the symbolic data received via the one or more input terminals and based on the input/output assignment configured to associate the one or more input terminals with the one or more output terminals and the virtualized control system.

8. The system of claim 1, wherein the first container is configured to be provided by one or more off-premise computing devices communicatively coupled together as part of a first network that is external to a second network associated with the industrial automation system, wherein the one or more off-premise computing devices are configured to communicate to the processing circuitry via a gateway device communicatively coupled between the first network and the second network.

9. The system of claim 1, wherein the virtualized control system is configured to expose the event notification to the one or more input terminals without persistence.

10. The system of claim 1, wherein the processing circuitry is configured to provide the virtualized control system based on receiving a container image from a container orchestration system.

11. The system of claim 1, wherein the processing circuitry is configured to:

generate the IO assignment configured to associate the one or more output terminals with the one or more input terminals;

provide the virtualized control system communicatively coupled to the industrial network device via the one or more output terminals based on the IO assignment;

transmit the symbolic data corresponding to the virtualized control system via the one or more input terminals to the industrial network device; and generate an additional IO assignment configured to dissociate the one or more output terminals with the one or more input terminals and the virtualized control system.

12. A non-transitory, tangible, computer-readable medium storing instructions that, when executed by processing circuitry, cause the processing circuitry to perform operations comprising:

receiving a first container image corresponding to a first deployed container from a container orchestration system;

executing the first container image to spin up the first deployed container;

providing a virtualized control system based on the first deployed container, wherein the virtualized control system is communicatively coupled to one or more input terminals associated with a symbolic common industrial protocol (CIP) namespace and able to be coupled to an industrial network device at one or more output terminals based on an input/output (IO) assignment;

receiving data from a second deployed container;

operating the virtualized control system to expose the data via the symbolic CIP namespace configured to provide symbolic data to the one or more input terminals based on the data and the IO assignment; and transmitting the symbolic data via the one or more input terminals to the industrial network device.

13. The non-transitory, tangible, computer-readable medium of claim 12, wherein the instructions cause the processing circuitry to perform operations comprising receiving the data based on receiving an event notification from the second deployed container corresponding to a container-based monitoring application disposed external to an industrial automation system comprising the container orchestration system and the industrial network device.

14. The non-transitory, tangible, computer-readable medium of claim 12, wherein the instructions cause the processing circuitry to perform operations comprising operating the virtualized control system to expose the data in response to the industrial network device polling the symbolic CIP namespace.

15. The non-transitory, tangible, computer-readable medium of claim 12, wherein the instructions cause the processing circuitry to perform operations comprising generating the IO assignment configured to associate the one or more output terminals with the one or more input terminals and the virtualized control system.

16. The non-transitory, tangible, computer-readable medium of claim 15, wherein the instructions cause the processing circuitry to perform operations comprising:

determining to terminate the provision of the virtualized control system based on one or more end conditions being met, a trigger event occurring, or both, terminating the provision of the virtualized control system; and generating an additional input/output assignment configured to dissociate the one or more output terminals with the one or more input terminals and the virtualized control system.

17. A non-transitory, tangible, computer-readable medium storing instructions that, when executed by first processing circuitry of an industrial network device, cause the industrial network device to perform operations comprising:

receiving an input/output assignment configured to associate one or more output terminals with one or more input terminals of second processing circuitry and with a virtualized control system, wherein the second processing circuitry is configured to provide the virtualized control system as associated with a control network level disposed below a supervisory network level;

receiving, via a communicative coupling between the one or more output terminals and the one or more input terminals, data from the virtualized control system based on the input/output assignment, wherein the data was generated in association with an operation of an asset by a container deployed external to the second processing circuitry;

identifying an adjustment to a visualization presented via a human-machine interface (HMI) based on the data;

generating one or more control signals to implement the adjustment;

receiving an additional input/output assignment configured to dissociate the one or more output terminals with the one or more input terminals and the virtualized control system; and removing an indication of the input/output assignment in memory based on the additional input/output assignment.

18. The non-transitory, tangible, computer-readable medium of claim 17, wherein the instructions cause the first processing circuitry to perform operations comprising:

receiving the data from the virtualized control system exposing the data via a symbolic common industrial protocol (CIP) namespace identified by the input/output assignment.

19. The non-transitory, tangible, computer-readable medium of claim 17, wherein the asset is different from the first processing circuitry and the second processing circuitry.

20. The non-transitory, tangible, computer-readable medium of claim 17, wherein the instructions cause the first processing circuitry to perform operations comprising:

determining that the data indicates an alarm status associated with the asset; and transmitting the data to an additional network device associated with an operational and control network level disposed above the control network level and a field network level comprising the asset.

* * * * *